United States Patent
Chou et al.

(10) Patent No.: US 8,458,444 B2
(45) Date of Patent: Jun. 4, 2013

(54) APPARATUS AND METHOD FOR HANDLING DEPENDENCY CONDITIONS BETWEEN FLOATING-POINT INSTRUCTIONS

(75) Inventors: Yuan C. Chou, Los Gatos, CA (US); Jared C. Smolens, San Jose, CA (US); Jeffrey S. Brooks, Austin, TX (US)

(73) Assignee: Oracle America, Inc., Redwood City, CA (US)

( * ) Notice: Subject to any disclaimer, the term of this patent is extended or adjusted under 35 U.S.C. 154(b) by 432 days.

(21) Appl. No.: 12/428,459

(22) Filed: Apr. 22, 2009

(65) Prior Publication Data
US 2010/0274992 A1  Oct. 28, 2010

(51) Int. Cl.
*G06F 9/30* (2006.01)
(52) U.S. Cl.
USPC .......................... 712/222; 712/216
(58) Field of Classification Search
None
See application file for complete search history.

(56) References Cited

U.S. PATENT DOCUMENTS

| | | | |
|---|---|---|---|
| 5,710,902 | A | 1/1998 | Sheaffer et al. |
| 5,737,629 | A | 4/1998 | Zuraski, Jr. et al. |
| 5,790,827 | A * | 8/1998 | Leung ............................ 712/216 |
| 5,822,578 | A | 10/1998 | Frank et al. |
| 5,941,983 | A | 8/1999 | Gupta et al. |
| 5,974,524 | A | 10/1999 | Cheong et al. |
| 6,014,736 | A | 1/2000 | Elliott et al. |
| 6,029,243 | A | 2/2000 | Pontius et al. |
| 6,055,625 | A | 4/2000 | Nakada et al. |
| 6,094,719 | A * | 7/2000 | Panwar ............................ 712/216 |
| 6,105,129 | A * | 8/2000 | Meier et al. .................... 712/222 |
| 6,356,918 | B1 | 3/2002 | Chuang et al. |
| 6,463,525 | B1 * | 10/2002 | Prabhu ............................ 712/222 |
| 6,493,819 | B1 | 12/2002 | Mahurin et al. |
| 6,505,293 | B1 | 1/2003 | Jourdan et al. |
| 6,560,671 | B1 | 5/2003 | Samra et al. |
| 6,598,149 | B1 | 7/2003 | Clift |
| 6,675,288 | B2 | 1/2004 | Farrell et al. |
| 7,191,316 | B2 | 3/2007 | Sugumar et al. |
| 7,237,096 | B1 * | 6/2007 | Prabhu et al. ................. 712/218 |

(Continued)

FOREIGN PATENT DOCUMENTS

EP    1128262    2/2001

OTHER PUBLICATIONS

Office Action in U.S. Appl. No. 12/428,461 issued May 19, 2011, 12 pages.

(Continued)

*Primary Examiner* — Jacob A Petranek
(74) *Attorney, Agent, or Firm* — Meyertons, Hood, Kivlin, Kowert & Goetzel, P.C.

(57) ABSTRACT

Techniques for handling dependency conditions, including evil twin conditions, are disclosed herein. An instruction may designate a source register comprising two portions. The source register may be a double-precision register and its two portions may be single-precision portions, each specified as destinations by two other single-precision instructions. Execution of these two single-precision instructions, especially on a register renaming machine, may result in the appropriate values for the two portions of the source register being stored in different physical locations, which can complicate execution of an instruction stream. In response to detecting a potential dependency, one or more instructions may be inserted in an instruction stream to enable the appropriate values to be stored within one physical double precision register, eliminating an actual or potential evil twin dependency. Embodiments including a compiler that inserts instructions in a generated instruction stream to eliminate dependency conditions are also contemplated.

18 Claims, 10 Drawing Sheets

U.S. PATENT DOCUMENTS

| | | | |
|---|---|---|---|
| 7,340,590 | B1 | 3/2008 | Sugumar et al. |
| 7,401,206 | B2 | 7/2008 | Hetherington et al. |
| 7,434,031 | B1 * | 10/2008 | Spracklen et al. ............ 712/217 |
| 7,558,945 | B2 | 7/2009 | Deosaran et al. |
| 7,624,253 | B2 | 11/2009 | Begon et al. |
| 7,840,783 | B1 | 11/2010 | Singh et al. |
| 2002/0129224 | A1 * | 9/2002 | Leber et al. ................... 712/209 |
| 2004/0148492 | A1 | 7/2004 | Sugumar et al. |
| 2005/0216705 | A1 | 9/2005 | Shibayama et al. |
| 2005/0216706 | A1 | 9/2005 | Abdallah et al. |
| 2008/0189535 | A1 | 8/2008 | Agarwal et al. |
| 2008/0201556 | A1 | 8/2008 | Chen |
| 2008/0276076 | A1 | 11/2008 | Abernathy et al. |
| 2010/0274961 | A1 | 10/2010 | Golla et al. |
| 2010/0274993 | A1 | 10/2010 | Golla et al. |
| 2010/0332805 | A1 | 12/2010 | Blasco Allue et al. |

OTHER PUBLICATIONS

Response to Office Action in U.S. Appl. No. 12/428,461 issued May 19, 2011, mailed Aug. 19, 2011, 15 pages.

Office Action in U.S. Appl. No. 12/428,461 issued Sep. 23, 2011, 14 pages.

Office Action in U.S. Appl. No. 12/428,464 issued May 12, 2011, 26 pages.

Response to Office Action in U.S. Appl. No. 12/428,464 issued May 12, 2011, mailed Aug. 12, 2011, 11 pages.

Office Action in U.S. Appl. No. 12/428,464 issued Sep. 29, 2011, 29 pages.

Robert M. Keller, "Look-Ahead Processors," Computing Surveys, vol. 7, No. 4, Dec. 1975, pp. 177-195.

* cited by examiner

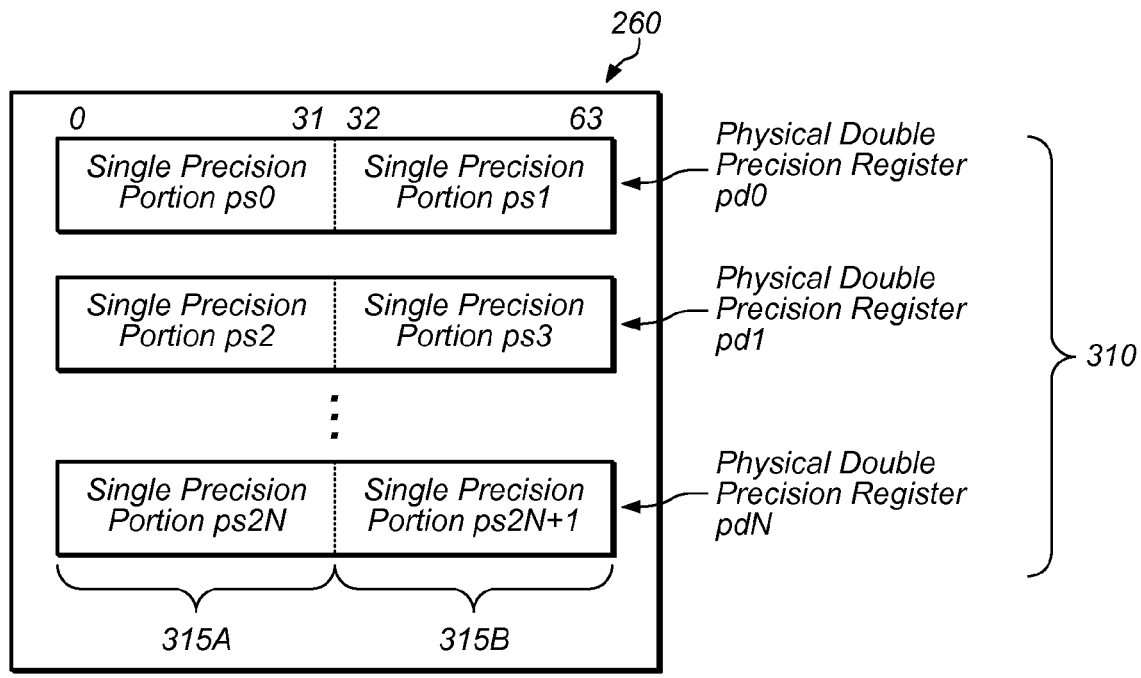
FIG. 3A
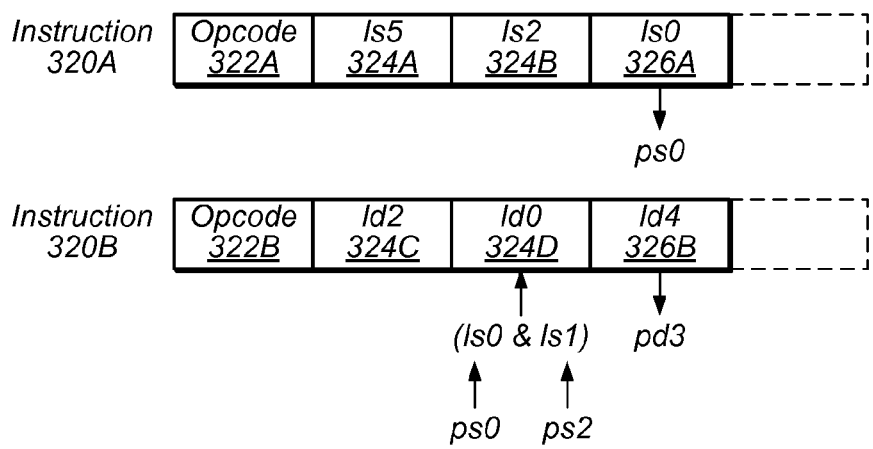
FIG. 3B
```
330                          335
  ↙                            ↙
fadds f0, f1, f2         ldf [o1], f0
faddd f2, f4, f6         ldf [o1+0x4], f1
                         ldf [o2], f2
                         ldf [o2+0x4], f3
                         faddd f0, f2, f4
```
FIG. 3C

APPARATUS AND METHOD FOR HANDLING DEPENDENCY CONDITIONS BETWEEN FLOATING-POINT INSTRUCTIONS

BACKGROUND OF THE INVENTION

1. Field of the Invention

This disclosure relates generally to computer processors, and particularly to mitigation of dependencies in the instruction stream, including so-called "evil twin" conditions.

2. Description of the Related Art

In some computer instruction set architectures (ISAs), instructions may address portions of a register. Such architectures may, as a result, exhibit dependency conditions, including what can be referred to as an "evil twin" condition in the context of an architecture that allows addressing of single-precision portions of a double-precision "aliased" register pair.

An evil twin condition may arise, for example, in a processor implementing the SPARC ISA. The SPARC ISA allows a logical 64-bit floating-point (FP) register to be accessed as either one double-precision (DP) register or as two single-precision (SP) registers. The SPARC ISA provides SP FP instructions that specify SP source and destination registers as well as DP FP instructions that specify DP source and destination registers. Performance penalties have arisen when an application program uses both SP FP instructions and DP FP instructions within the same code region. Specifically, a performance penalty may exist where a DP FP instruction that has, as its source(s), one or more DP FP register(s) that is (are) the destination(s) of one or more preceding SP FP instructions that are still being executed by the processor (i.e. they have not yet retired). One situation in which this condition may arise is when a compiler cannot ascertain that DP FP data is stored in a 64-bit aligned memory location. The compiler then uses two SP FP loads to read the two halves of the DP data before performing computation on the data using a DP FP instruction.

Dependencies such as evil twin conditions are problematic for processor performance.

SUMMARY

Techniques are described herein to alleviate problems associated with certain types of execution dependencies, including evil twin dependencies. In various embodiments, instructions are inserted into an instruction stream as a way of handling execution dependencies. In some embodiments, the inserted instructions may allow evil twin "consumer" instructions to begin execution sooner then they would otherwise, or begin execution before evil twin "producer" instructions retire (i.e., commit).

In some embodiments, a detection unit is configured to detect whether an evil twin condition arises with respect to two instructions in an instruction stream. Information regarding at least one of the two instructions and information indicating the evil twin execution dependency may be stored in a dependency storage unit.

In response to stored information indicating an evil twin execution dependency for at least one of the two instructions, an apparatus may be configured to insert one or more instructions into the instruction stream between the two instructions. This insertion may be accomplished, at least in, part by a decode unit within a pipeline. The inserted one or more instructions may be executable to cause two (or more) values that are required by a logical source register of a potential evil twin victim instruction to be stored in one physical register (or an equivalent physical structure). The insertion of instructions may take place subsequent to a previous execution of at least one of the two instructions and/or in conjunction with a current execution of at least one of the two instructions.

In some embodiments, the stored information indicating the evil twin execution dependency may be stored at least partly within an instruction cache. In other embodiments, the stored information may be stored at least partly within a predictor table. However, the subject matter of this disclosure is not thus limited, and other means of storing the necessary information will be apparent to those with skill in the art.

A compiler and/or assembler may also be configured to translate high level code into low level code in such a way as to insert one or more instructions into an instruction stream so that evil twin scenarios are circumvented.

BRIEF DESCRIPTION OF THE DRAWINGS

FIG. 3A is a block diagram illustrating one embodiment of a register file including floating-point registers.

FIG. 3B is block diagram illustrating an example of register renaming.

FIG. 3C illustrates two specific examples of instruction sequences that have evil twin conditions.

DETAILED DESCRIPTION

Related co-pending U.S. application Ser. Nos. 12/428,457, 12/428,461, and 12/428,464, filed concurrently with the present application and respectively entitled "Physically Indexed Logical Map Table," "Logical Map Table For Detecting Dependency Conditions Between Instructions Having Varying Width Operand Values," and "Processor Operating Mode For Mitigating Dependency Conditions" are herein incorporated by reference in their entireties.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Figure 1:
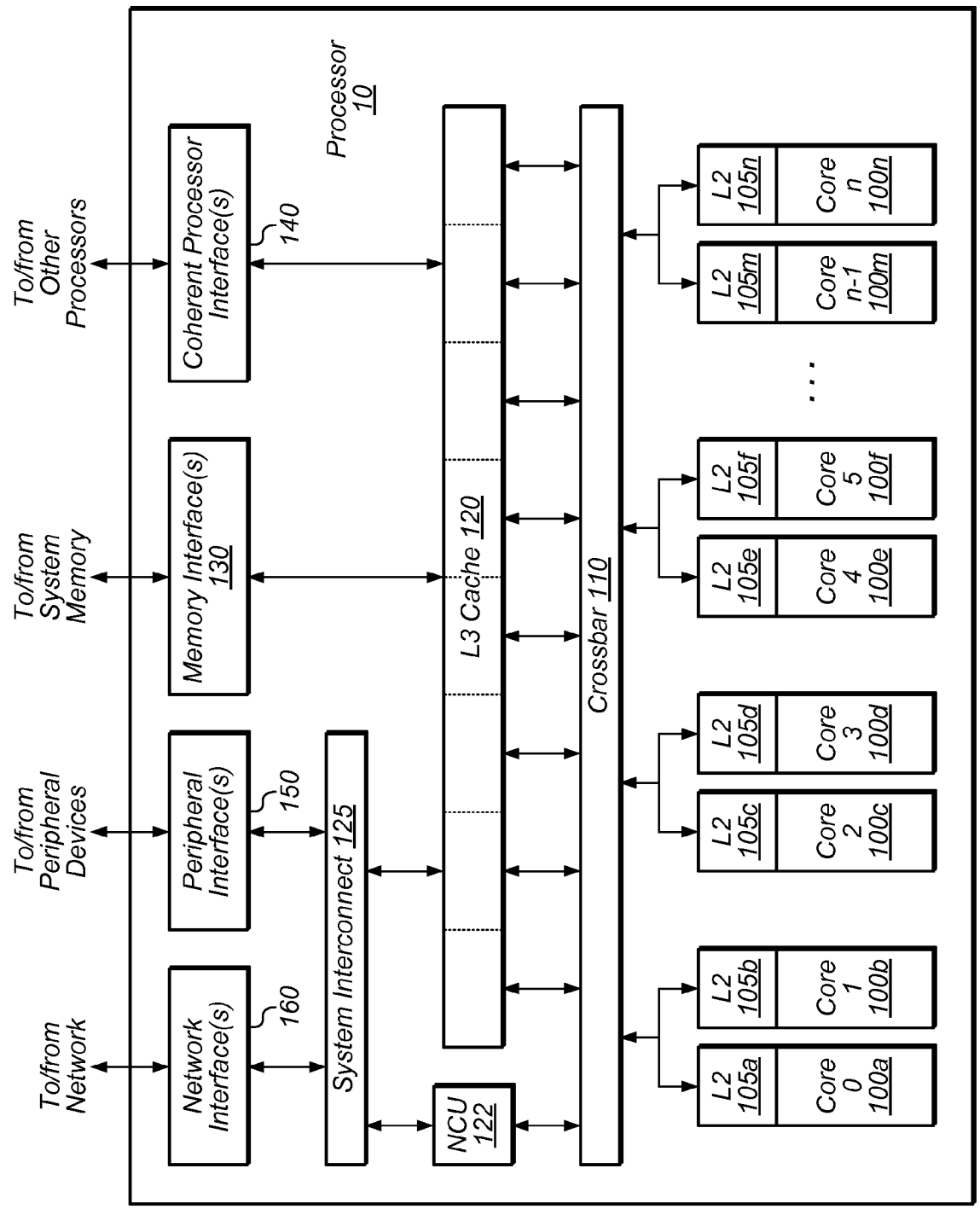
FIG. 1 is a block diagram illustrating one embodiment of a multithreaded processor 10.
Figure 2:
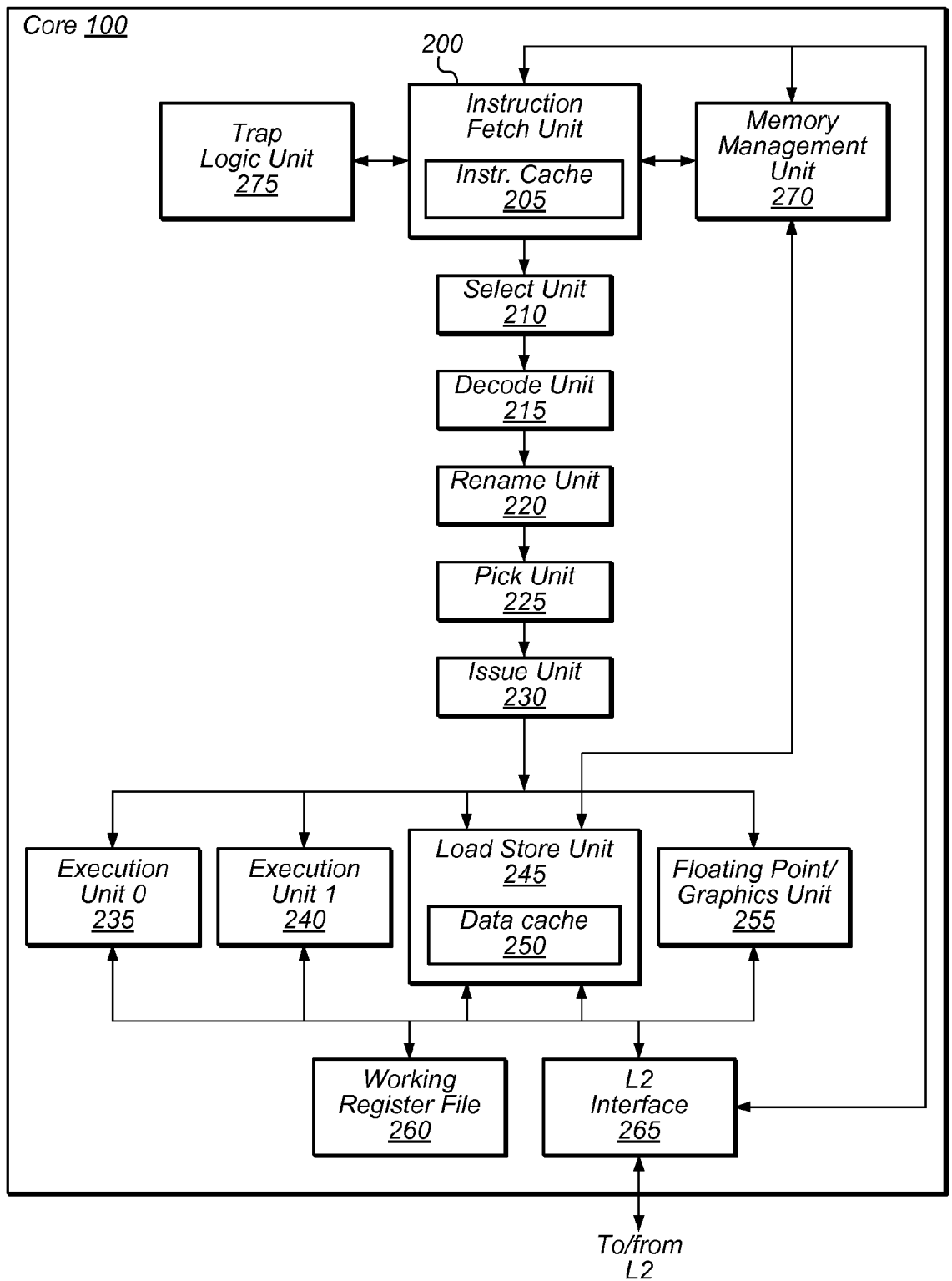
FIG. 2 is a block diagram illustrating one embodiment of a processor core 100.

FIGS. 1-2 present an overview of an exemplary processor. FIGS. 3A-D describe a type of dependency condition, one instance of which can be referred to as an "evil twin" condition. FIGS. 4-7 relate to systems and methods for handling such dependencies in a processor. FIG. 8 illustrates an exemplary system in which a processor employing the disclosed techniques may be utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising a plurality of storage units . . . ." Such a claim does not foreclose the apparatus from including additional components (e.g., a network interface unit, graphics circuitry, user interface devices, etc.).

"Instruction stream." An instruction stream is a series of computer instructions executable by one or more processor cores. An instruction stream may include conditional branches and jumps. Thus the execution of instructions in an instruction stream is not limited to a serial or linear flow. Through the execution of a conditional branch, a jump. or other instructions, one or more other instructions in the instruction stream may be executed more than once. (E.g., imagine a "for" loop in a high-level language such as C++).

"Double-precision" and "single-precision." These terms are given their ordinary meaning in the art, including the floating-point standards defined by IEEE 754.

"Physical register" and "logical register." A physical register is a hardware register in a computing device or core. A logical register is a register specified in an instruction. A logical register generally corresponds to at least one physical register but may not have the same name as the physical register.

"Logical source and "logical destination." These terms, as used herein, are shorthand for "logical source register" and "logical destination register," i.e., a source register specified by an instruction and a destination register specified by an instruction.

"Evil twin producer." An evil twin producer is an instruction that specifies a destination that is one portion of a logical register with two or more portions that may be collectively used as a source for another instruction. In some contexts, "evil twin producer" may refer to an instruction that produces an actual evil twin condition, i.e., the instruction has not committed before the execution of another instruction specifying the logical register as a source requires the value output by the evil twin producer. In other contexts, "evil twin producer" may simply refer to an instruction that has the potential to produce an evil twin condition during execution, but depending on execution flow, may or may not actually produce an evil twin condition.

"Evil Twin consumer." An evil twin consumer may also be known as an "evil twin victim." The evil twin consumer is an instruction that specifies a logical source that is comprised of at least two portions, at least one of which is capable of being specified as a destination of another instruction. In some contexts, "evil twin consumer" may refer to an instruction that suffers from an actual evil twin condition. In other contexts, "evil twin consumer" may simply refer to an instruction that has the potential to suffer from an evil twin condition, but depending on execution flow, may or may not actually suffer from an evil twin condition.

"Execution dependency." As used herein, this term generally refers to a direct execution dependency, which exists between an initial and subsequent instruction in an instruction stream when the initial instruction specifies a given logical register as a destination and the subsequent instruction specifies the given logical register as a source, and no intervening instruction between the initial instruction and the subsequent instruction specifies the given logical register as a destination.

"In-flight" instruction. An instruction is considered to be "in-flight" if it is in some stage of being executed but has not yet committed.

"Configured." As used herein, this term means that a particular piece of hardware or software is arranged to perform a particular task or tasks when operated. Thus, an apparatus that is "configured to" perform task A means that the apparatus may include a circuit, program instructions stored in memory, or other structure that, during operation of the computer system, performs or can be used to perform task A. (As such, an apparatus can be "configured to" perform task A even if the apparatus is not currently on.)

"Portion." As used herein, the term "portion" refers to less than the entirety of an entity such as a register or other storage element.

Overview of Multithreaded Processor Architecture

A block diagram illustrating one embodiment of a multithreaded processor 10 is shown in FIG. 1. In the illustrated embodiment, processor 10 includes a number of processor cores 100a-n, which are also designated "core 0" though "core n." Various embodiments of processor 10 may include varying numbers of cores 100, such as 8, 16, or any other suitable number. Each of cores 100 is coupled to a corresponding L2 cache 105a-n, which in turn couple to L3 cache 120 via a crossbar 110. Cores 100a-n and L2 caches 105a-n may be generically referred to, either collectively or individually, as core(s) 100 and L2 cache(s) 105, respectively.

Via crossbar 110 and L3 cache 120, cores 100 may be coupled to a variety of devices that may be located externally to processor 10. In the illustrated embodiment, one or more memory interface(s) 130 may be configured to couple to one or more banks of system memory (not shown). One or more coherent processor interface(s) 140 may be configured to couple processor 10 to other processors (e.g., in a multiprocessor environment employing multiple units of processor 10). Additionally, system interconnect 125 couples cores 100 to one or more peripheral interface(s) 150 and network interface(s) 160. As described in greater detail below, these interfaces may be configured to couple processor 10 to various peripheral devices and networks.

Cores 100 may be configured to execute instructions and to process data according to a particular instruction set architecture (ISA). In one embodiment, cores 100 may be configured to implement a version of the SPARC® ISA, such as SPARC® V9, UltraSPARC Architecture 2005, UltraSPARC Architecture 2007, or UltraSPARC Architecture 2009, for example. However, in other embodiments it is contemplated that any desired ISA may be employed, such as x86 (32-bit or 64-bit versions), PowerPC® or MIPS®, for example.

In the illustrated embodiment, each of cores 100 may be configured to operate independently of the others, such that all cores 100 may execute in parallel. Additionally, as described below in conjunction with the descriptions of FIG. 2, in some embodiments, each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from a variable number of threads, up to eight concurrently-executing threads. In a 16-core implementation, processor 10 could thus concurrently execute up to 128 threads. However, in other embodiments it is contemplated that other numbers of cores 100 may be provided, and that cores 100 may concurrently process different numbers of threads.

Additionally, as described in greater detail below, in some embodiments, each of cores 100 may be configured to execute certain instructions out of program order, which may also be referred to herein as out-of-order execution, or simply OOO. As an example of out-of-order execution, for a particular thread, there may be instructions that are subsequent in program order to a given instruction yet do not depend on the given instruction. If execution of the given instruction is delayed for some reason (e.g., owing to a cache miss), the later instructions may execute before the given instruction completes, which may improve overall performance of the executing thread.

As shown in FIG. 1, in one embodiment, each core 100 may have a dedicated corresponding L2 cache 105. In one embodiment, L2 cache 105 may be configured as a set-associative, writeback cache that is fully inclusive of first-level cache state (e.g., instruction and data caches within core 100). To maintain coherence with first-level caches, embodiments of L2 cache 105 may implement a reverse directory that maintains a virtual copy of the first-level cache tags. L2 cache 105 may implement a coherence protocol (e.g., the MESI protocol) to maintain coherence with other caches within processor 10. In one embodiment, L2 cache 105 may enforce a Total Store Ordering (TSO) model of execution in which all store instructions from the same thread must complete in program order.

In various embodiments, L2 cache 105 may include a variety of structures configured to support cache functionality and performance. For example, L2 cache 105 may include a miss buffer configured to store requests that miss the L2, a fill buffer configured to temporarily store data returning from L3 cache 120, a writeback buffer configured to temporarily store dirty evicted data and snoop copyback data, and/or a snoop buffer configured to store snoop requests received from L3 cache 120. In one embodiment, L2 cache 105 may implement a history-based prefetcher that may attempt to analyze L2 miss behavior and correspondingly generate prefetch requests to L3 cache 120.

Crossbar 110 may be configured to manage data flow between L2 caches 105 and the shared L3 cache 120. In one embodiment, crossbar 110 may include logic (such as multiplexers or a switch fabric, for example) that allows any L2 cache 105 to access any bank of L3 cache 120, and that conversely allows data to be returned from any L3 bank to any L2 cache 105. That is, crossbar 110 may be configured as an M-to-N crossbar that allows for generalized point-to-point communication. However, in other embodiments, other interconnection schemes may be employed between L2 caches 105 and L3 cache 120. For example, a mesh, ring, or other suitable topology may be utilized.

Crossbar 110 may be configured to concurrently process data requests from L2 caches 105 to L3 cache 120 as well as data responses from L3 cache 120 to L2 caches 105. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple L2 caches 105 attempt to access a single bank of L3 cache 120, or vice versa.

L3 cache 120 may be configured to cache instructions and data for use by cores 100. In the illustrated embodiment, L3 cache 120 may be organized into eight separately addressable banks that may each be independently accessed, such that in the absence of conflicts, each bank may concurrently return data to a respective L2 cache 105. In some embodiments, each individual bank may be implemented using set-associative or direct-mapped techniques. For example, in one embodiment, L3 cache 120 may be an 8 megabyte (MB) cache, where each 1 MB bank is 16-way set associative with a 64-byte line size. L3 cache 120 may be implemented in some embodiments as a writeback cache in which written (dirty) data may not be written to system memory until a corresponding cache line is evicted. However, it is contemplated that in other embodiments, L3 cache 120 may be configured in any suitable fashion. For example, L3 cache 120 may be implemented with more or fewer banks, or in a scheme that does not employ independently-accessible banks; it may employ other bank sizes or cache geometries (e.g., different line sizes or degrees of set associativity); it may employ write-through instead of writeback behavior; and it may or may not allocate on a write miss. Other variations of L3 cache 120 configuration are possible and contemplated.

In some embodiments, L3 cache 120 may implement queues for requests arriving from and results to be sent to crossbar 110. Additionally, in some embodiments L3 cache 120 may implement a fill buffer configured to store fill data arriving from memory interface 130, a writeback buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 cache 120 may variously be implemented as single-ported or multiported (i.e., capable of processing multiple concurrent read and/or write accesses). In either case, L3 cache 120 may implement arbitration logic to prioritize cache access among various cache read and write requesters.

Not all external accesses from cores 100 necessarily proceed through L3 cache 120. In the illustrated embodiment, non-cacheable unit (NCU) 122 may be configured to process requests from cores 100 for non-cacheable data, such as data from I/O devices as described below with respect to peripheral interface(s) 150 and network interface(s) 160.

Memory interface 130 may be configured to manage the transfer of data between L3 cache 120 and system memory, for example in response to cache fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2, 3, or 4 Synchronous Dynamic Random Access Memory (DDR/DDR2/DDR3/DDR4 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. System interconnect 125 may be configured to provide a central interface for such sources to exchange data with cores 100, L2 caches 105, and/or L3 cache 120. In some embodiments, system interconnect 125 may be configured to coordinate Direct Memory Access (DMA) transfers of data to and from system memory. For example, via memory interface 130, system interconnect 125 may coordinate DMA transfers between system memory and a network device attached via network interface 160, or between system memory and a peripheral device attached via peripheral interface 150.

Processor 10 may be configured for use in a multiprocessor environment with other instances of processor 10 or other compatible processors. In the illustrated embodiment, coherent processor interface(s) 140 may be configured to implement high-bandwidth, direct chip-to-chip communication between different processors in a manner that preserves memory coherence among the various processors (e.g., according to a coherence protocol that governs memory transactions).

Peripheral interface 150 may be configured to coordinate data transfer between processor 10 and one or more peripheral devices. Such peripheral devices may include, for example and without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of a standard peripheral interface. For example, one embodiment of peripheral interface 150 may implement the Peripheral Component Interface Express (PCI Express™ or PCIe) standard according to generation 1.x, 2.0, 3.0, or another suitable variant of that standard, with any suitable number of I/O lanes. However, it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more network devices (e.g., networked computer systems or peripherals) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example. However, it is contemplated that any suitable networking standard may be implemented, including forthcoming standards such as 40-Gigabit Ethernet and 100-Gigabit Ethernet. In some embodiments, network interface 160 may be configured to implement other types of networking protocols, such as Fibre Channel, Fibre Channel over Ethernet (FCoE), Data Center Ethernet, Infiniband, and/or other suitable networking protocols. In some embodiments, network interface 160 may be configured to implement multiple discrete network interface ports.

Overview of Dynamic Multithreading Processor Core

As mentioned above, in one embodiment each of cores 100 may be configured for multithreaded, out-of-order execution. More specifically, in one embodiment, each of cores 100 may be configured to perform dynamic multithreading. Generally speaking, under dynamic multithreading, the execution resources of cores 100 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be I/O-bound rather than processor-bound-completion of an individual request may require I/O accesses (e.g., to relatively slow memory, network, or storage devices) that dominate the overall time required to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to allocate processor resources in a manner that flexibly adapts to workloads that vary along the continuum described above. In one embodiment, cores 100 may be configured to implement fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Through the use of fine-grained multithreading, cores 100 may be configured to efficiently process workloads that depend more on concurrent thread processing than individual thread performance.

In one embodiment, cores 100 may also be configured to implement out-of-order processing, speculative execution, register renaming and/or other features that improve the performance of processor-dependent workloads. Moreover, cores 100 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of a given core 100 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

One embodiment of core 100 that is configured to perform dynamic multithreading is illustrated in FIG. 2. In the illustrated embodiment, core 100 includes an instruction fetch unit (IFU) 200 that includes an instruction cache 205. IFU 200 is coupled to a memory management unit (MMU) 270, L2 interface 265, and trap logic unit (TLU) 275. IFU 200 is additionally coupled to an instruction processing pipeline that begins with a select unit 210 and proceeds in turn through a decode unit 215, a rename unit 220, a pick unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a data cache 250, and/or a floating-point/graphics unit (FGU) 255. These instruction execution resources are coupled to a working register file 260. Additionally, LSU 245 is coupled to L2 interface 265 and MMU 270.

In the following discussion, exemplary embodiments of each of the structures of the illustrated embodiment of core 100 are described. However, it is noted that the illustrated partitioning of resources is merely one example of how core 100 may be implemented. Alternative configurations and variations are possible and contemplated.

Instruction fetch unit 200 may be configured to provide instructions to the rest of core 100 for execution. In one embodiment, IFU 200 may be configured to select a thread to be fetched, fetch instructions from instruction cache 205 for the selected thread and buffer them for downstream processing, request data from L2 cache 105 in response to instruction cache misses, and predict the direction and target of control transfer instructions (e.g., branches). In some embodiments, IFU 200 may include a number of data structures in addition to instruction cache 205, such as an instruction translation lookaside buffer (ITLB), instruction buffers, and/or structures configured to store state that is relevant to thread selection and processing.

In one embodiment, during each execution cycle of core 100, IFU 200 may be configured to select one thread that will enter the IFU processing pipeline. Thread selection may take into account a variety of factors and conditions, some thread-specific and others IFU-specific. For example, certain instruction cache activities (e.g., cache fill), ITLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved. In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 200, instructions may actually be fetched for the selected thread. To perform the fetch, in one embodiment, IFU 200 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 200 may store the retrieved instructions within buffers for use by later stages of the instruction pipeline. If there is a cache miss, IFU 200 may coordinate retrieval of the missing cache data from L2 cache 105. In some embodiments, IFU 200 may also be configured to prefetch instructions into instruction cache 205 before the instructions are actually required to be fetched. For example, in the case of a cache miss, IFU 200 may be configured to retrieve the missing data for the requested fetch address as well as addresses that sequentially follow the requested fetch address, on the assumption that the following addresses are likely to be fetched in the near future.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 200 may be configured to predict the direction and target of CTIs (or, in some embodiments, a subset of the CTIs that are defined for an ISA) in order to reduce the delays incurred by waiting until the effect of a CTI is known with certainty. In one embodiment, IFU 200 may be configured to implement a perceptron-based dynamic branch predictor, although any suitable type of branch predictor may be employed.

To implement branch prediction, IFU 200 may implement a variety of control and data structures in various embodiments, such as history registers that track prior branch history, weight tables that reflect relative weights or strengths of predictions, and/or target data structures that store fetch addresses that are predicted to be targets of a CTI. Also, in some embodiments, IFU 200 may further be configured to partially decode (or predecode) fetched instructions in order to facilitate branch prediction. A predicted fetch address for a given thread may be used as the fetch address when the given thread is selected for fetching by IFU 200. The outcome of the prediction may be validated when the CTI is actually executed (e.g., if the CTI is a conditional instruction, or if the CTI itself is in the path of another predicted CTI). If the prediction was incorrect, instructions along the predicted path that were fetched and issued may be cancelled.

Through the operations discussed above, IFU 200 may be configured to fetch and maintain a buffered pool of instructions from one or multiple threads, to be fed into the remainder of the instruction pipeline for execution. Generally speaking, select unit 210 may be configured to select and schedule threads for execution. In one embodiment, during any given execution cycle of core 100, select unit 210 may be configured to select up to one ready thread out of the maximum number of threads concurrently supported by core 100 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may be configured to allocate certain execution resources of core 100 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In one embodiment, two slots 0-1 may be defined, where slot 0 includes instructions executable in load/store unit 245 or execution units 235-240, and where slot 1 includes instructions executable in execution units 235-240, floating-point/graphics unit 255, and any branch instructions. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In one embodiment, rename unit 220 may be configured to rename the logical (i.e., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, pick unit 225 may be configured to pick instructions that are ready for execution and send the picked instructions to issue unit 230. In one embodiment, pick unit 225 may be configured to maintain a pick queue that stores a number of decoded and renamed instructions as well as information about the relative age and status of the stored instructions. During each execution cycle, this embodiment of pick unit 225 may pick up to one instruction per slot. For example, taking instruction dependency and age information into account, for a given slot, pick unit 225 may be configured to pick the oldest instruction for the given slot that is ready to execute.

In some embodiments, pick unit 225 may be configured to support load/store speculation by retaining speculative load/store instructions (and, in some instances, their dependent instructions) after they have been picked. This may facilitate replaying of instructions in the event of load/store misspeculation. Additionally, in some embodiments, pick unit 225 may be configured to deliberately insert "holes" into the pipeline through the use of stalls, e.g., in order to manage downstream pipeline hazards such as synchronization of certain load/store or long-latency FGU instructions.

Issue unit 230 may be configured to provide instruction sources and data to the various execution units for picked instructions. In one embodiment, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 100 includes a working register file 260 that may be configured to store instruction results (e.g., integer results, floating-point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In one embodiment, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculation and for load/store instructions executed by LSU 245. EXU1 240 may be configured to execute integer instructions issued from slot 1, as well as branch instructions. In one embodiment, FGU instructions and multicycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments execution units 235-240 may not be bound to specific issue slots, or may be differently bound than just described.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In one embodiment, data cache 250 may be configured as a set-associative, write-through cache in which all stores are written to L2 cache 105 regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking. LSU 245 may include a miss buffer configured to store outstanding loads and stores that cannot yet complete, for example due to cache misses. In one embodiment, LSU 245 may implement a store queue configured to store address and data information for stores that have committed, in order to facilitate load dependency checking. LSU 245 may also include hardware configured to support atomic load-store instructions, memory-related exception detection, and read and write access to special-purpose registers (e.g., control registers).

Floating-point/graphics unit 255 may be configured to execute and provide results for certain floating-point and graphics-oriented instructions defined in the implemented ISA. For example, in one embodiment FGU 255 may implement single- and double-precision floating-point arithmetic instructions compliant with the IEEE 754-1985 floating-point standard, such as add, subtract, multiply, divide, and certain transcendental functions. Also, in one embodiment FGU 255 may implement partitioned-arithmetic and graphics-oriented instructions defined by a version of the SPARC® Visual Instruction Set (VIS™) architecture, such as VIS™ 2.0 or VIS™ 3.0. In some embodiments, FGU 255 may implement fused and unfused floating-point multiply-add instructions. Additionally, in one embodiment FGU 255 may implement certain integer instructions such as integer multiply, divide, and population count instructions. Depending on the implementation of FGU 255, some instructions (e.g., some transcendental or extended-precision instructions) or instruction operand or result scenarios (e.g., certain denormal operands or expected results) may be trapped and handled or emulated by software.

In one embodiment, FGU 255 may implement separate execution pipelines for floating-point add/multiply, divide/square root, and graphics operations, while in other embodiments the instructions implemented by FGU 255 may be differently partitioned. In various embodiments, instructions implemented by FGU 255 may be fully pipelined (i.e., FGU 255 may be capable of starting one new instruction per execution cycle), partially pipelined, or may block issue until complete, depending on the instruction type. For example, in one embodiment floating-point add and multiply operations may be fully pipelined, while floating-point divide operations may block other divide/square root operations until completed.

Embodiments of FGU 255 may also be configured to implement hardware cryptographic support. For example, FGU 255 may include logic configured to support encryption/decryption algorithms such as Advanced Encryption Standard (AES), Data Encryption Standard/Triple Data Encryption Standard (DES/3DES), the Kasumi block cipher algorithm, and/or the Camellia block cipher algorithm. FGU 255 may also include logic to implement hash or checksum algorithms such as Secure Hash Algorithm (SHA-1, SHA-256, SHA-384, SHA-512), or Message Digest 5 (MD5). FGU 255 may also be configured to implement modular arithmetic such as modular multiplication, reduction and exponentiation, as well as various types of Galois field operations. In one embodiment, FGU 255 may be configured to utilize the floating-point multiplier array for modular multiplication. In various embodiments, FGU 255 may implement several of the aforementioned algorithms as well as other algorithms not specifically described.

The various cryptographic and modular arithmetic operations provided by FGU 255 may be invoked in different ways for different embodiments. In one embodiment, these features may be implemented via a discrete coprocessor that may be indirectly programmed by software, for example by using a control word queue defined through the use of special registers or memory-mapped registers. In another embodiment, the ISA may be augmented with specific instructions that may allow software to directly perform these operations.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may be configured to provide a translation. In one embodiment, MMU 270 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e., a page miss), MMU 270 may be configured to generate a trap to allow a memory management software routine to handle the translation. It is contemplated that in various embodiments, any desirable page size may be employed. Further, in some embodiments multiple page sizes may be concurrently supported.

As noted above, several functional units in the illustrated embodiment of core 100 may be configured to generate off-core memory requests. For example, IFU 200 and LSU 245 each may generate access requests to L2 cache 105 in response to their respective cache misses. Additionally, MMU 270 may be configured to generate memory requests, for example while executing a page table walk. In the illustrated embodiment, L2 interface 265 may be configured to provide a centralized interface to the L2 cache 105 associated with a particular core 100, on behalf of the various functional units that may generate L2 accesses. In one embodiment, L2 interface 265 may be configured to maintain queues of pending L2 requests and to arbitrate among pending requests to determine which request or requests may be conveyed to L2 cache 105 during a given execution cycle. For example, L2 interface 265 may implement a least-recently-used or other algorithm to arbitrate among L2 requesters. In one embodiment, L2 interface 265 may also be configured to receive data returned from L2 cache 105, and to direct such data to the appropriate functional unit (e.g., to data cache 250 for a data cache fill due to miss).

During the course of operation of some embodiments of core 100, exceptional events may occur. For example, an instruction from a given thread that is selected for execution by select unit 210 may not be a valid instruction for the ISA implemented by core 100 (e.g., the instruction may have an illegal opcode), a floating-point instruction may produce a result that requires further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 275 may be configured to manage the handling of such events. For example, TLU 275 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 275 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 275 may implement such traps as precise traps. That is, TLU 275 may ensure that all instructions from the given thread that occur before the trapping instruction (in program order) complete and update architectural state, while no instructions from the given thread that occur after the trapping instruction (in program) order complete or update architectural state.

Additionally, in the absence of exceptions or trap requests, TLU 275 may be configured to initiate and monitor the commitment of working results to architectural state. For example, TLU 275 may include a reorder buffer (ROB) that coordinates transfer of speculative results into architectural state. TLU 275 may also be configured to coordinate thread flushing that results from branch misprediction. For instructions that are not flushed or otherwise cancelled due to mispredictions or exceptions, instruction processing may end when instruction results have been committed.

In various embodiments, any of the units illustrated in FIG. 2 may be implemented as one or more pipeline stages, to form an instruction execution pipeline that begins when thread fetching occurs in IFU 200 and ends with result commitment by TLU 275. Depending on the manner in which the functionality of the various units of FIG. 2 is partitioned and implemented, different units may require different numbers of cycles to complete their portion of instruction processing. In some instances, certain units (e.g., FGU 255) may require a variable number of cycles to complete certain types of operations.

Through the use of dynamic multithreading, in some instances, it is possible for each stage of the instruction pipeline of core 100 to hold an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

As described previously, however, the various resources of core 100 that support fine-grained multithreaded execution may also be dynamically reallocated to improve the performance of workloads having fewer numbers of threads. Under these circumstances, some threads may be allocated a larger share of execution resources while other threads are allocated correspondingly fewer resources. Even when fewer threads are sharing comparatively larger shares of execution resources, however, core 100 may still exhibit the flexible, thread-specific flush and stall behavior described above.

Single/Double-Precision Dependency Conditions Including Evil Twin Conditions

As described above, register file 260 of FIG. 2 may store the results of executed instructions, including floating-point instructions. Values may be stored in registers within register file 260 according to any suitable format, including various floating-point formats. One embodiment of a register file 260 including floating-point registers is illustrated in FIG. 3A. In the illustrated embodiment, register file 260 includes a group of physical 64 bit double-precision registers 310 (referred to individually as registers pd0-pdN), each of which includes two single-precision portions 315A and 315B (shown as portions ps0-ps2N+1) corresponding to bits 0-31 and 32-63 of a register 310. The use of a 64-bit register format is merely exemplary, and other sizes are possible. Two single-precision registers that comprise a double-precision register (e.g., ps0 and ps1) may be referred to as an "aliased pair" because they can be collectively addressed (e.g., via pd0.) In some embodiments and instruction set architectures, a double-precision register may be referred to by the same name as the name for a first of the single-precision portions in an aliased pair. The context in which that name appears will make clear whether the reference is to the first single-precision portion or to the entire double-precision register (for example, whether the register name appears in the context of a single-precision instruction, or a double-precision instruction, such as "fadds" and "faddd" discussed below with reference to FIG. 3C). Register file 260 may additionally include other types of registers (e.g., fixed-point registers, not shown).

In certain embodiments, a processor (e.g., processor 10) may support read and write operations to register file 260 in which either a portion (e.g., half) or an entirety of a register is accessed (read or written). (As used herein, when the term "portion" is used in conjunction with a register, it is referring to less than the entirety of the register.) Thus, in one embodiment, register file 260 may support read and write operations that access a double-precision register 310 or only one of the single-precision register portions 315. For example, an instruction may read a value from single-precision portion ps0 and write the result into single-precision portion ps2. Alternatively, an instruction may read from double-precision register pd0 (thus reading both single-precision portions ps0 and ps1) and write the result to the double-precision portion of register pd2 (thus writing both single-precision portions ps2 and ps3).

During the course of operation, a processor (e.g., 10), in some embodiments, may execute a sequence of instructions in which a dependency condition exists between two or more floating-point instructions, where a first floating-point instruction writes to a first portion of a first register (e.g., a single-precision portion of a double-precision register), and a second, subsequent floating-point instruction reads from the first portion and a second portion of the first register (e.g., both single-precision halves of a double-precision register).

In the context of a double-precision floating-point architecture, this dependency may be referred to as an evil twin condition. The teachings of the present disclosure, however, are not limited to only single-precision/double-precision architectures (nor, strictly speaking, are the teachings limited to use with floating-point registers).

Dependencies such as evil twin conditions in a processor instruction stream can undesirably increase execution time. In particular, consider an architecture in which register renaming is utilized, where "logical" destination registers (i.e., architected registers specified by instructions in the instruction stream) are mapped to registers within a set of physical registers. The set of physical registers available to the processor for renaming may be referred to as "rename registers." Where a first floating-point instruction in the processor's instruction stream writes to a single-precision destination, only half of the physical register to which this destination is mapped may be known to contain a valid value. Thus, when this first floating-point instruction is followed by a second floating-point instruction that reads from an aliased pair that includes the single-precision register to which the first floating-point instruction's destination was mapped, undesirable latency can result as described below.

Turning now to FIG. 3B, an example of register renaming is depicted. As shown, each instruction (320A and 320B) includes an operation code (opcode) 322, logical source operands 324 that specify logical source registers, and a logical destination operand 326 that specifies a logical destination register. These logical registers are limited to the number of registers specified in the instruction set architecture (ISA) of the processor. In one embodiment, an ISA may use 16 logical registers, meaning that operand fields 324 in instructions 320 are 4 bits wide. Any suitable organization of instructions is possible. Other instructions 320 may, of course, include other combinations of operands. Other information may also be present in instructions 320.

For example, in one embodiment, once instruction 320A is decoded, the single-precision destination logical register (ls0) specified by operand 326A is mapped to a corresponding one of physical registers 310 (ps0). (In certain embodiments, all source and destination registers may be renamed.) In the embodiment shown, subsequent instruction 320B is executable to read from double-precision source operands ld2 (ls2 and ls3) and ld0 (ls0 and ls1). It can be seen that an evil twin condition exists here, since ls0 currently is mapped to ps0 and ls1 is not stored within ps0 (ls1 may be in a different rename register or a register dedicated to that logical register in different embodiments).

A dependency such as the evil twin condition described above may necessitate having to read separate single-precision portions (e.g., for ls0 and ls1) from two different physical registers (e.g., ps0 and ps2) for a single instruction source operand. In order to perform these multiple reads, register file 260 might have to include multiple read ports for each physical floating-point register or access each register during separate clock cycles, increasing execution time.

Turning now to FIG. 3C, two specific examples of instruction sequences that have evil twin conditions are illustrated. While these instruction sequences include instructions from the SPARC ISA, instruction sequences of other ISAs may also have evil twin conditions.

Instruction sequence 330 includes a first single-precision floating-point instruction "fadds f0, f1, f2" and a second double-precision floating-point instruction "faddd f2, f4, f6." The "fadds" instruction is executable to add the values stored in the single-precision sources f0 and f1 and stores the result in the single-precision destination f2. The "faddd" instruction is executable to add double-precision sources f2 and f4, and store the result in f6. (In the SPARC ISA, double-precision floating-point instructions use the operand of the first single-precision portion to refer to the entire double precision registers (an aliased pair)-e.g., the operand f2 refers collectively to the single precision portions f2 and f3, and the operand f4 refers to both portions f4 and f5.) Sequence 330 thus has a dependency with an evil twin condition because "fadds" writes to the single-precision destination f2 and "faddd" reads from the double-precision source that includes f2.

Instruction sequence 335 includes four single-precision floating-point instructions "ldf" that are executable to load values into single-precision sources f0, f1, f2, and f3, followed by a double-precision "faddd" instruction that is executable to add the values stored in double-precision sources f0 (i.e., portions f0 and f1) and f2 (i.e., portions f2 and f3) and store the result in double-precision destination f4. Sequence 335 has four dependencies with evil twin conditions because the load instructions write to single-precision destinations f0, f1, f2, and f3, and "faddd" reads from the double-precision sources that include f0, f1, f2, and f3.

Figure 3D:
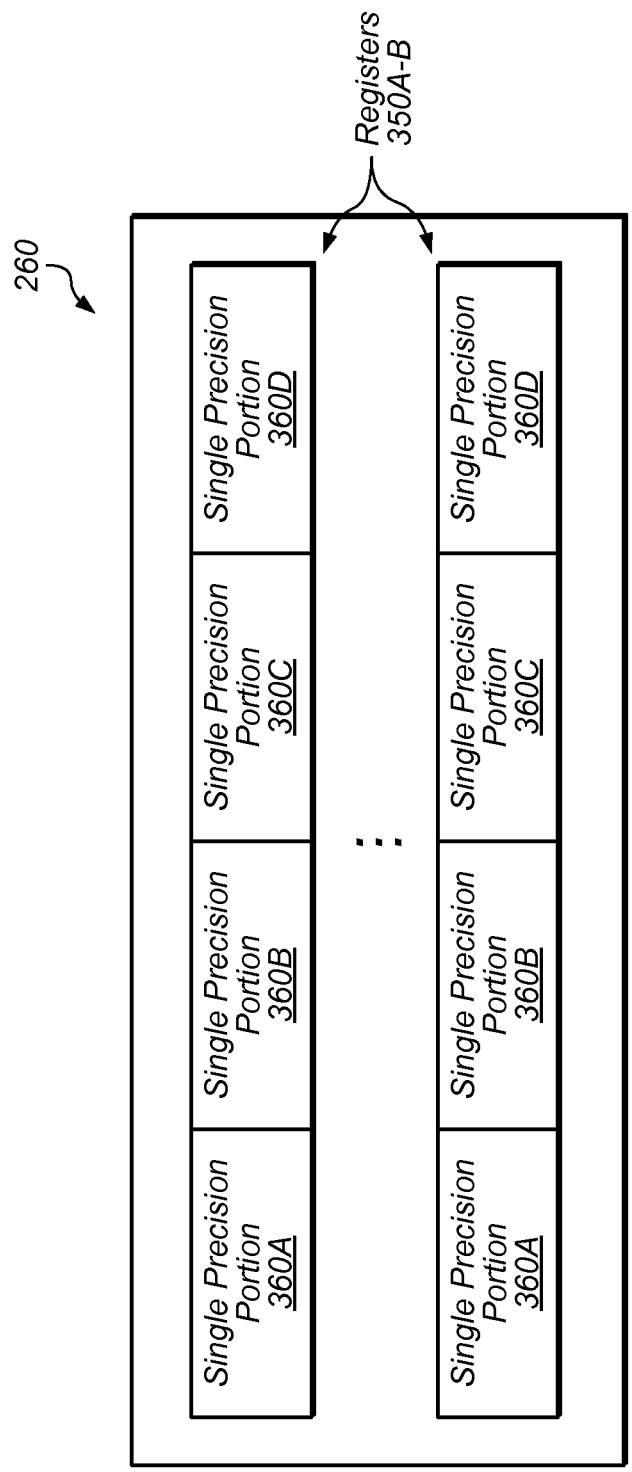
FIG. 3D is a block diagram illustrating another embodiment of a register file.

Although the above description presents examples with double-precision registers having single-precision portions, dependencies requiring multiple reads to separate physical registers may exist in other configurations that employ different register sizes and/or different levels of precision. For example, FIG. 3D illustrates another embodiment of a register file 260 in which registers 350 each have four portions 360A-D that may be individually accessible. In other embodiments, registers 350 may be different sizes (e.g., 256 bits), and the accessible portions 360 may be larger or smaller (e.g., 64 bits or 16 bits). Accordingly, the embodiments described herein are not limited to double-precision registers having separately accessible single-precision halves; instead, the described embodiments are more broadly applicable to situations in which a portion of a storage element or register is written to, followed (not necessarily in direct succession, however) by a read from a larger portion or entirety of the element/register. Furthermore, although the disclosed embodiments are described primarily in the context of floating-point values, the teachings of the present disclosure are not so limited and may also be applied to other types of register formats.

Condition Handling

Figure 4:
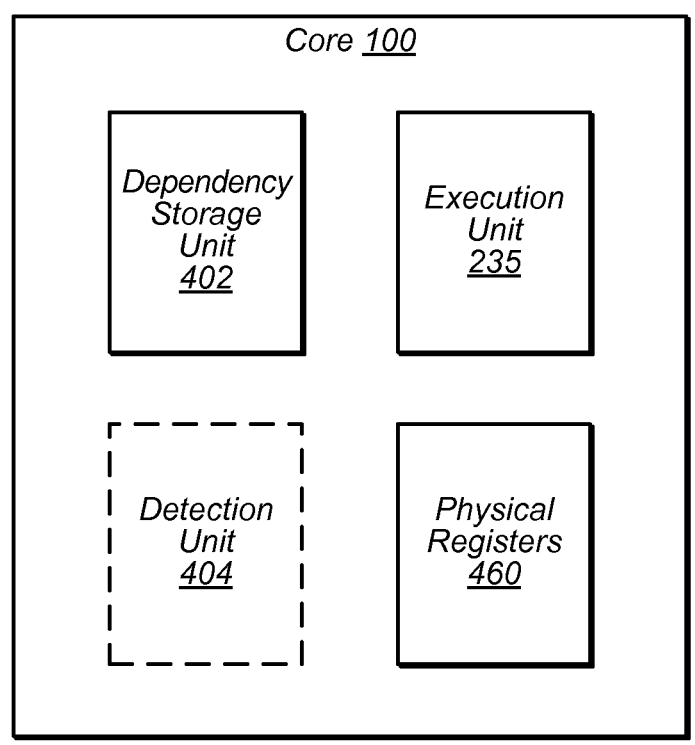
FIG. 4 is a block diagram illustrating a use of a dependency storage unit and detection unit within processor core 100.

Turning now to FIG. 4, a block diagram of an embodiment of processor core 100 is depicted. As shown, core 100 includes execution unit 235, physical registers 460, detection unit 404, and dependency storage unit 402.

Execution unit 235 is substantially as described above, but may include additional circuits, hardware, and/or ports adapted for the techniques described herein. In some embodiments, core 100 may have more than one execution unit. Execution unit 235 may also be considered to represent a plurality of discrete execution units described above.

Physical registers 460 are a plurality of physical registers and in some embodiments may comprise working register file 260. Physical registers 460 may include a set of rename registers that are available to core 100.

Dependency storage unit 402 may comprise a plurality of storage elements configured to store information indicative of an execution dependency between first and second instructions in an instruction stream. An initial one of the first and second instructions may be an evil twin producer, and the other subsequent one of the first and second instructions may be an evil twin consumer.

Detection unit 404 is configured to detect an evil twin dependency. (Unit 404 is shown with a dotted line to indicate that it can occur in a multiplicity of locations within core 100.) In some embodiments, detection unit 404 is configured to detect an evil twin dependency during an initial execution of the first and second instructions. Detection unit 404 may provide information to dependency storage unit 402 that causes dependency storage unit 402 to store information indicative of the execution dependency between the first and second instructions. As described below, information stored in unit 402 may be helpful in improving core 100 performance during subsequent execution of a code sequence that includes the first and second instructions (e.g., as a part of a code loop).

Dependency storage unit 402 and detection unit 404 may be wholly separate hardware structures in some embodiments, or consist of wholly or partly combined structures in other embodiments. Units 402 and 404 may, in various embodiments, be coupled to, or wholly or partially implemented in, various structures of core 100 shown depicted in FIG. 2. In one embodiment, detection unit 404 may be implemented in rename unit 220, as described in co-pending U.S. application Ser. No. 12/428,461, entitled "Logical Map Table For Detecting Dependency Conditions Between Instructions Having Varying Width Operand Values," filed concurrently with the present application.

In response to information stored in dependency storage unit 402 indicating an execution dependency between an evil twin producer and an evil twin consumer, one or more instructions may be inserted between the producer and consumer. The inserted one or more instructions may be executable by the execution unit 235 to cause a first physical register in physical registers 460 to receive first and second floating-point values that are to be used collectively as a source by the evil twin consumer.

In some embodiments, the inserted one or more instructions may comprise an "fmovstod" instruction (floating-point move single to double) that is supported by the ISA. The fmovstod instruction specifies two logical single-precision floating-point registers as its sources and one logical double-precision floating-point register as its destination. The two single-precision floating-point registers may be portions of either one or two double-precision floating-point registers. Note that "fmovstod" is an illustrative name only, and that this instruction may be given any appropriate name.

In other embodiments, an existing instruction in an ISA that copies a source double-precision floating-point register to a destination double-precision register (such as the "fsrc" instruction in the SPARC ISA) may be implemented in such a way as to achieve the same effects as an "finovstod" instruction. In these embodiments, the existing instruction can read the double-precision floating-point source register as two single-precision floating-point source registers, concatenate the contents of the two registers, and copy the result to the double-precision floating-point destination register. In yet other embodiments, new types of instructions may be added to an instruction set architecture in order to accomplish the techniques described herein.

The inserted one or more instructions are not limited to the above examples, however. Any instructions may be inserted in response to information stored in the dependency storage unit 402 as long as they achieve the desired effect of causing a first physical register to receive at least first and second floating-point values that are to be used collectively as a source by another instruction. Note that if there are multiple evil twin consumers corresponding to the same evil twin producer, the one or more instructions only need be inserted ahead of the "earliest" evil twin consumer to resolve the problem with respect to all subsequent consumers. In this manner, the inserted one or more instructions are executable in such a manner as to break a first execution dependency between an evil twin producer and an evil twin consumer, and to create a second execution dependency between the inserted instruction(s) and the evil twin consumer.

Figure 5A:
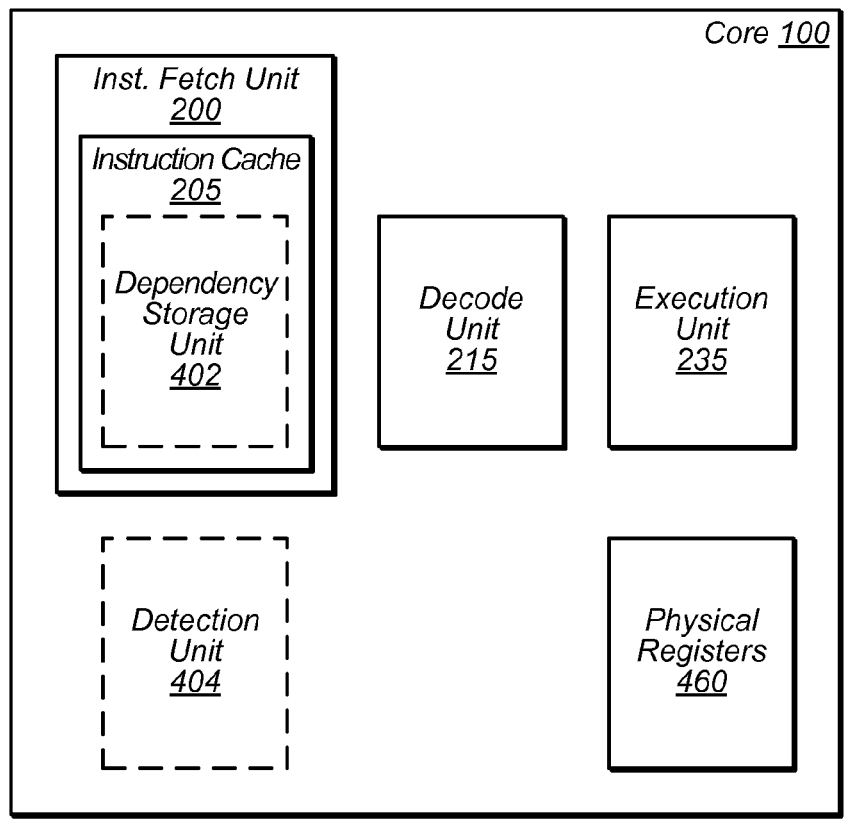
FIGS. 5A and 6A are block diagrams illustrating a use of a dependency storage unit with an instruction cache.

Turning now to FIG. 5A, a block diagram illustrating a use of a dependency storage unit 402 with an instruction cache 205 is shown. In this embodiment, core 100 comprises execution unit 235, physical registers 460, detection unit 404, dependency storage unit 402, instruction fetch unit (IFU) 200, instruction cache 205, and decode unit 215. Dependency storage unit 402 may be partially or wholly within instruction cache 205, which is within IFU 200. Dependency storage unit 402 within instruction cache 205, in this and in other embodiments, is one means for storing information indicative of an execution dependency between at least a first floating-point instruction in an instruction stream and a second, subsequent floating-point instruction in the instruction stream, wherein the first floating-point instruction specifies a first portion of a first logical register as a destination, and wherein the second, subsequent floating-point instruction specifies at least the first portion and a second portion of the first logical register as a first source.

Decode unit 215 may be configured to insert the one or more instructions in response to stored information in the dependency storage unit 402 indicating an evil twin dependency between two instructions in an instruction stream. Decode unit 215, in this and in other embodiments, is thus one means for responding to an indication of stored information indicating an execution dependency by inserting the one or more instructions into the instruction stream. One way in which decode unit 215 may insert instructions into the instruction stream is by decoding an instruction indicated as part of an execution dependency into two or more other instructions. For example, a potential evil twin producer may be treated as a "complex2" operation consisting of two micro-ops. The first micro-op may correspond to the original evil twin producer that specifies as a destination a portion of a register with two (or more) portions, and the second micro-op may correspond to a floating-point move that specifies two register portions as sources and one register consisting of at least two portions as a destination. Insertion of instructions into the instruction stream is not limited to this example, however. Further details concerning unit 402 with regard to this and related embodiments are described below in the context of FIG. 6A.

Figure 5B:
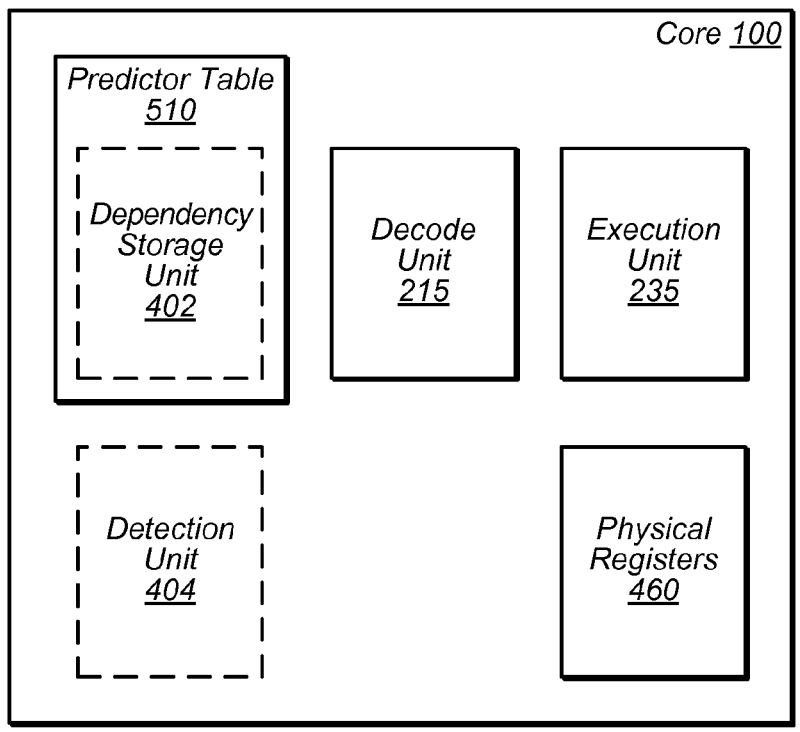
FIG. 5B and 6B are block diagrams illustrating a use of a dependency storage unit with a predictor table.

Turning now to FIG. 5B, a block diagram illustrating a use of a dependency storage table 402 with a predictor table 510 is shown. In this embodiment, core 100 comprises execution unit 235, dependency storage unit 402, detection unit 404, physical registers 460, predictor table 510, and decode unit 215. Dependency storage unit 402 in this embodiment is partially or wholly within predictor table 510. Dependency storage unit 402 within predictor table 510, in this and other embodiments, a means for storing information indicative of an execution dependency between at least a first floating-point instruction in an instruction stream and a second, subsequent floating-point instruction in the instruction stream. Decode unit 215, as described above with reference to FIG. 5A, may be configured to insert the one or more instructions in response to stored information in the dependency storage unit 402 indicating an evil twin dependency between two instructions in an instruction stream. Further details concerning unit 402 with regard to this and related embodiments are described below in the context of FIG. 6B.

Figure 6A:
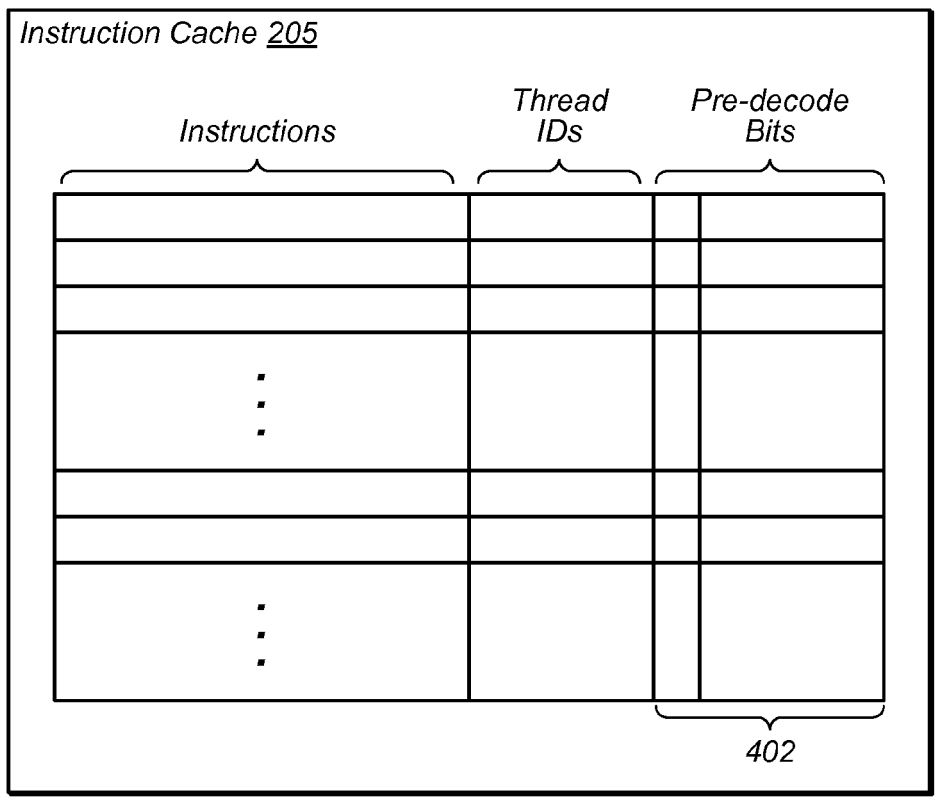

At FIG. 6A, a block diagram of dependency storage unit 402 within instruction cache 205 is depicted. In this embodiment, instruction cache 205 comprises an information table containing cached instructions, thread IDs associated with the cached instructions, and sets of pre-decode bits associated with the cached instructions. As shown, the sets of pre-decode bits include at least portions of storage locations that collectively make up dependency storage unit 402, but dependency storage unit 402 is not thus limited. Additional data structures and/or connecting structures may comprise dependency storage unit 402 in various embodiments. Pre-decode bits and/or other information contained in dependency storage unit 402 may be made available to various stages of the execution pipeline, as well as other structures within core 100.

A first one of the set of pre-decode bits associated with a cached instruction is configured to store an indication of an evil twin execution dependency. In one embodiment, the first pre-decode bit is configured to indicate whether a previous execution of the associated instruction resulted in that instruction being an actual evil twin producer. In another embodiment, the first pre-decode bit is configured to indicate whether a previous execution of the associated instruction resulted in that instruction being an actual evil twin consumer. Dependency storage unit 402 within instruction cache 205 is not limited to the above examples, however, and any one or more of the pre-decode bits in instruction cache 205 may be used to store the necessary indications. With respect to both FIGS. 6A and 6B, thread ID information may be omitted in the information table in embodiments for non-threaded machines.

Detection unit 404 may detect an evil twin dependency in an instruction stream by tracking the execution of the evil twin producer and providing information to dependency storage unit 402 within instruction cache 205 and instruction fetch unit 200. For example, instruction fetch unit 200 could, upon fetching a first instruction in the instruction stream, store information marking the first instruction as a potential evil twin producer if the first instruction specifies as a destination a portion of a logical register comprising at least two portions capable of being collectively used as one logical source by some other instruction. IFU 200 could also store information indicating the first instruction as "in-flight" when it begins its execution, as well as being configured to receive information indicating the later commitment of the first instruction (thus demarcating the point at which the first instruction is no longer "in-flight"). A second, subsequent instruction in the instruction stream might be a potential evil twin consumer (specifying as a logical source the same logical register comprising at least two portions, one of which is specified by the first instruction as a destination.) If the execution of the second instruction requires the values of the at least two portions comprising the logical source, and the values are required while the first instruction is still in-flight, an indication of these facts could be received by IFU 200. IFU 200 would then be able to detect that the first instruction was an actual (as opposed to potential) evil twin producer, as the execution of the first and second instructions resulted in an actual evil twin condition.

Thus, until the commitment of an instruction specifying as a destination a portion of a logical register comprising at least two portions capable of being collectively used as one logical source, that instruction may be marked in IFU 200 as a potential evil twin producer. Through appropriate tracking, it will be known by the time of that instruction's commitment, however, whether that instruction is an actual evil twin producer. (For example, see co-pending application U.S. Ser. No. 12/428,461, entitled "Logical Map Table For Detecting Dependency Conditions," which allows for the precise detection of evil-twin dependency conditions.) Using related techniques, detection unit 404 may also detect an evil twin dependency by tracking the execution of a potential evil twin consumer in an instruction stream, and convey an indication of this information to detection storage unit 402 within instruction cache 205 and IFU 200. However, detection unit 404 and dependency storage unit 402 are not limited to such embodiments, and one or more other structures in core 100 could also be adapted for use with detection unit 404 and/or dependency storage unit 402.

Figure 6B:
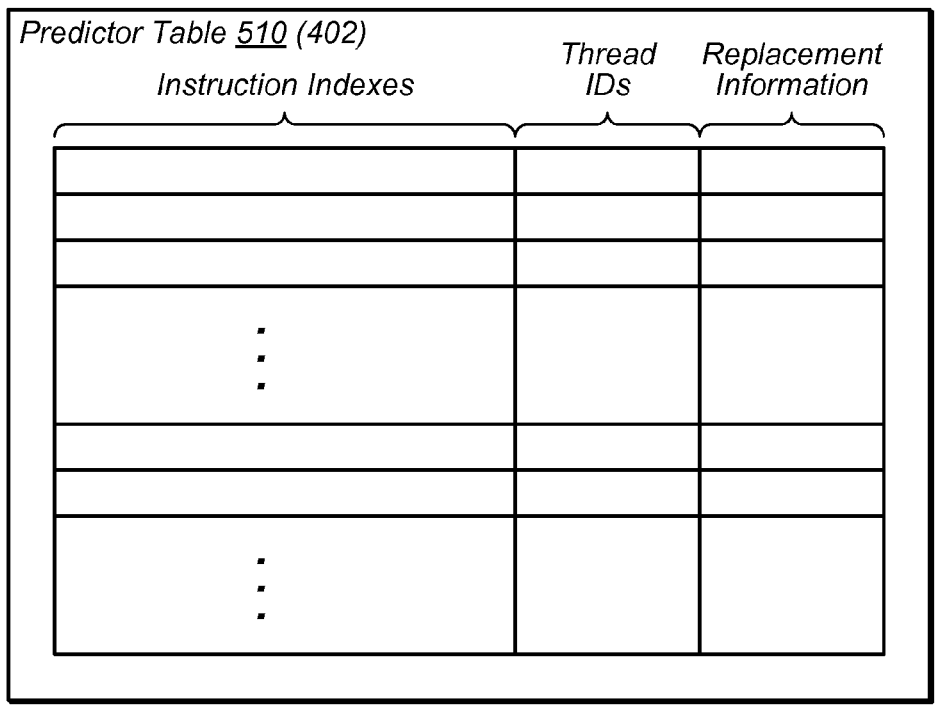

Turning now to FIG. 6B, a block diagram of predictor table 510 comprising dependency storage unit 402 is shown. In this embodiment, predictor table 510 comprises an information table containing index values associated with various instructions, thread IDs associated with those instructions, and dependency replacement information associated with those instructions. The index value for a given instruction may comprise a number of bits from the given instruction's program counter value and/or a number of bits from the given instruction's address in memory. Entries in the information table may be direct-mapped or set-associative or organized in any other suitable manner. Upon receiving an indication that the execution of a given instruction is associated with an evil twin execution dependency, an entry in the information table may be created. If no space in the information table is available for a new entry, the least recently used entry in the information table may be overwritten. Replacement information in the table may be maintained so as to be usable to determine a least recently used status, including, in some embodiments, an approximate least recently used status.

In one embodiment, the replacement information for an entry indicates that in a previous execution, the associated instruction was an actual evil twin producer. Thus, for a subsequent execution of the associated instruction, it is predicted that the associated instruction will again be an evil twin producer. If it is determined that the associated instruction is not actually an evil twin producer for a subsequent execution, the entry in the information table for the associated instruction may be invalidated. If two or more potential evil twin producers respectively specify destinations that are different portions of a logical register, it may be sufficient to insert one or more instructions in the instruction stream after the last such evil twin producer in order to solve the evil twin problem. In another embodiment, the replacement information for an entry indicates that the associated instruction was an actual evil twin consumer in a previous execution. Entry invalidation and insertion of instructions may be affected accordingly (e.g., affecting the insertion of instructions before an evil twin consumer).

In some embodiments, the replacement information for an entry corresponding to a potential evil twin consumer may contain an indication of the retirement status of one or more potential evil twin producer instructions specifying one or more destinations that are portions of the logical sources for the potential consumer. When one or more instructions are inserted in response to information in predictor table 510, only the unretired potential evil twin producer instructions need be accounted for. A specific, non-limiting example follows. A first instruction specifies a single-precision portion of a first logical double-precision register as its destination. A second instruction specifies a single-precision portion of a second logical double-precision register as its destination. A third, subsequent instruction specifies as its sources both the first and the second logical double-precision registers. If an entry exists in the information table indicating that the third instruction is a likely evil twin consumer, then the predictor table 510 could be configured to maintain in the replacement information for that entry indications of whether the first and second instructions had retired. Thus, if the first instruction retires by the time the execution of the third instruction requires the resulting value of the first instruction, the one or more instructions inserted to handle the evil twin condition(s) would only need to take into account the not-yet-committed second instruction, rather than both the first and second instruction.

Figure 7A:
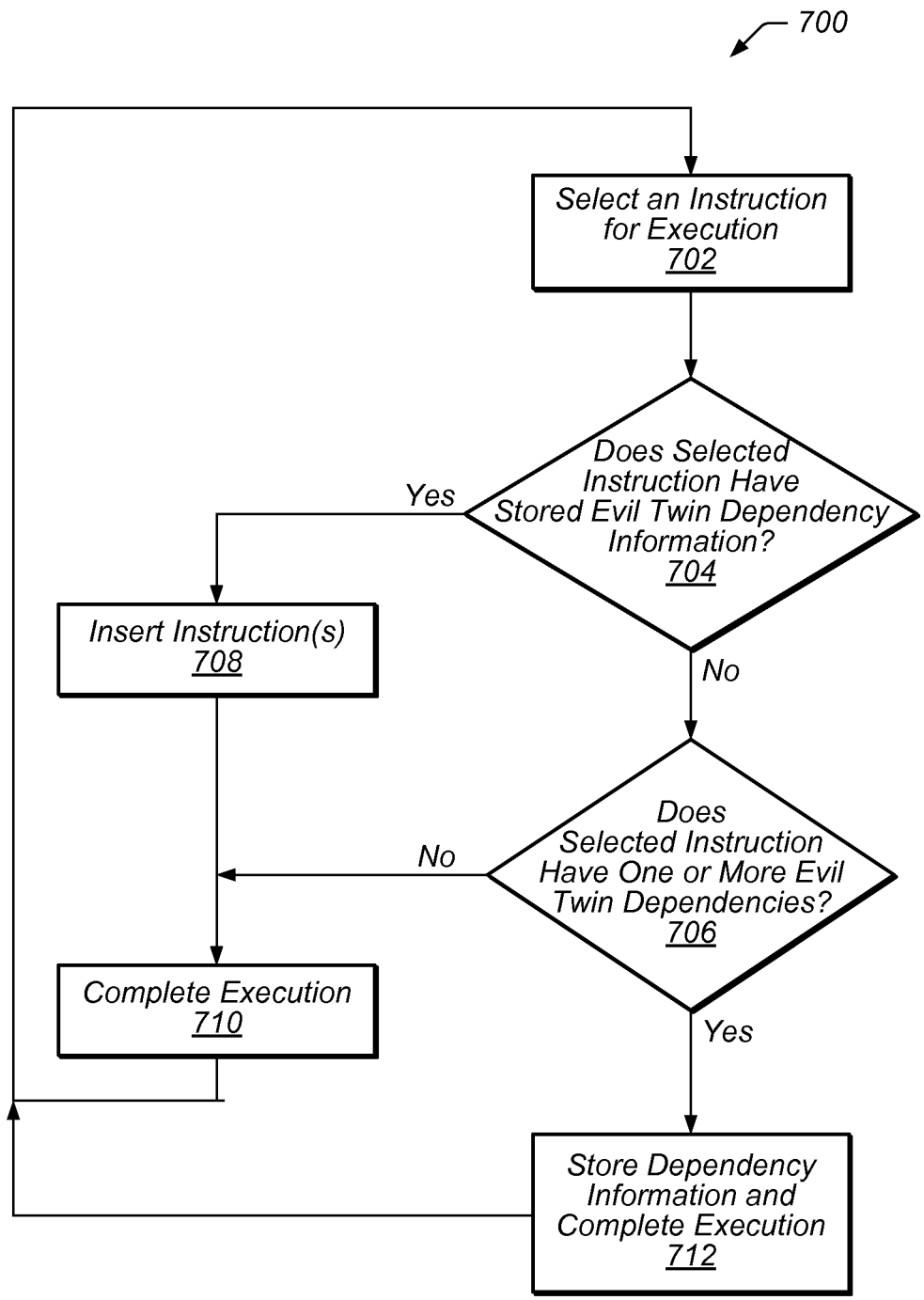
FIG. 7A is a flowchart of one embodiment of a method for detecting an evil twin condition, storing information indicating that condition, and accessing the stored information.
Figure 8:
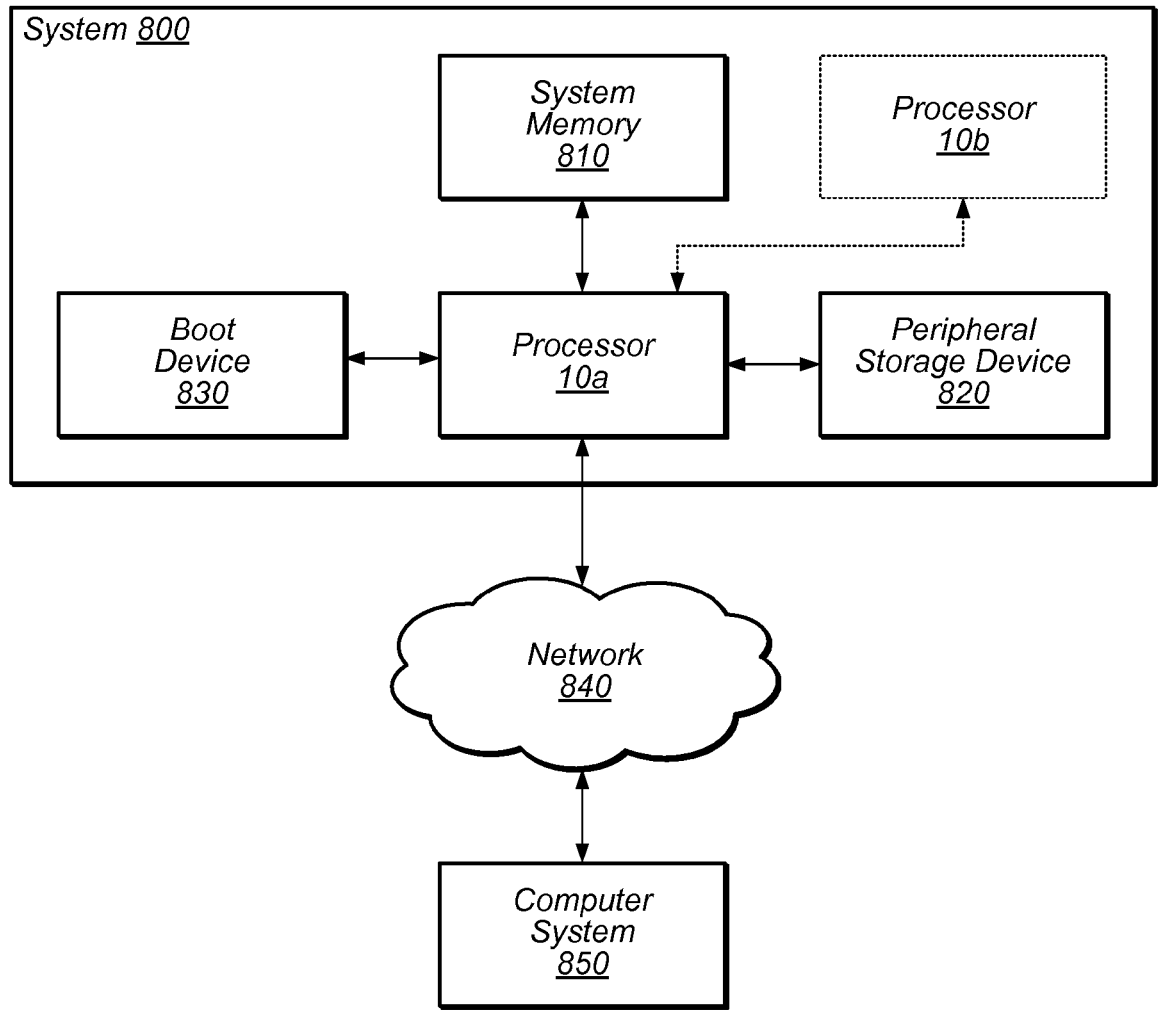
FIG. 8 is a block diagram illustrating one embodiment of a system including processor 10.

Turning now to FIG. 7A, a flowchart for a method 700 for handling evil twin conditions within one or more cores 100 is shown. At step 702, an instruction from an instruction stream is selected for execution. The selected instruction may be any instruction. The process of instruction selection in this method may or may not coincide with one or more operations performed by select unit 210, and is not limited in this respect. At step 704, it is determined whether the selected instruction has stored evil twin dependency information in dependency storage unit 402. Information stored in dependency storage unit 402 may have been stored in conjunction with a previous execution of the selected instruction. If stored evil twin dependency information does exist for the selected instruction, then at step 708, one or more instructions are inserted into the instruction stream. The inserted one or more instructions may vary by embodiment, depending on, for example, whether core 100 contains a dependency storage unit 402 configured to associate various instructions with an evil twin producer status or a dependency storage unit 402 configured to associate instructions with an evil twin consumer status. In some embodiments, decode unit 215 may insert the one or more instructions.

After one or more instructions are inserted at step 708, step 710 involves completing execution of the inserted and the selected instructions. In various embodiments, completion of execution may involve various stages of the instruction pipeline and other structures in core 100, depending on where and when the inserted instructions are actually injected into the instruction stream. Note that completing execution in steps 710 and 712 implies that instructions should normally finish execution and retire, but execution may still be considered complete for the purposes of method 700 even if a trap, architectural interrupts, or other specialized processing is encountered. After step 710, a new instruction may be selected at step 702. In some embodiments the moment in time at which step 702 begins for a subsequent instruction, however, is not necessarily limited by the progress of a previously selected instruction's progress through method 700, due to the nature of execution in a pipelined machine. Step 702 may thus begin for one instruction while another instruction is in any stage of the method.

Returning to step 704, if it is determined that no stored evil twin dependency information exists for a selected instruction, the method proceeds to step 706. Step 706 may actually occur at any moment during or after execution of the selected instruction, i.e., step 706 may occur contemporaneously with step 710 or 712, before one of those steps, or after one of those steps. Note also that in the steps of method 700, the storing of dependency information and execution of instructions may occur simultaneously, or in any order.

In step 706, it is determined whether the selected information has one or more evil twin execution dependencies. This may be accomplished through the operations of detection unit 404. Depending on whether it is desired to know if the selected instruction is an evil twin producer or an evil twin consumer, step 706 may or may not involve different analyses.

Step 706 may attempt to determine whether a selected instruction is an actual (as opposed to potential) evil twin producer. Prior to commitment of a selected instruction that is a potential evil twin producer, the execution of a second, a subsequent instruction may require the value that is to be stored in the destination specified by the selected potential evil twin producer instruction, thus resulting in an actual evil twin execution dependency. The method would proceed to step 712, in which information indicating the dependency is stored in dependency storage unit 402 and core 100 completes execution for the selected instruction. If no actual evil twin dependency is detected, the method proceeds through step 710.

Step 706 may attempt to determine whether a selected instruction is an actual evil twin consumer. Prior to commitment of a selected instruction that is a potential evil twin consumer, the selected instruction may require a value from an uncommitted, upstream evil twin producer, indicating an actual evil twin execution dependency. The method would proceed to step 712, in which information indicating the dependency is stored in dependency unit 402. Additional information regarding the upstream evil twin producer instruction(s) associated with the detected evil twin dependency may also be stored in dependency unit 402. Core 100 completes execution of the selected instruction. If no actual evil twin dependency is detected, the method proceeds through step 710.

After step 712, a new instruction may be selected at step 702. In some embodiments the moment in time at which step 702 begins for a new instruction, however, is not necessarily limited by the progress of a previously selected instruction's progress through method 700, due to the nature of execution in a pipelined machine. Step 702 may thus begin for one instruction while another instruction is in any stage of the method.

It will be appreciated that in the method of FIG. 7A, after an instruction is determined to have an actual evil twin condition, stored information may be retained in dependency storage unit 402 until the information is deleted, invalidated, or overwritten (e.g., when an entry is deleted as the result of a least-recently used replacement model for what may be a limited number of entries in storage unit 402). As such, method 700 may be thought of as having a "once an evil twin, always an evil twin" scheme, because for as long as information is retained in storage unit 402 indicating that a instruction was previously linked to an evil twin condition, all subsequent executions of that instruction will result in the insertion of instructions at step 708. This is in contrast to the method of FIG. 7B, described below.

Figure 7B:
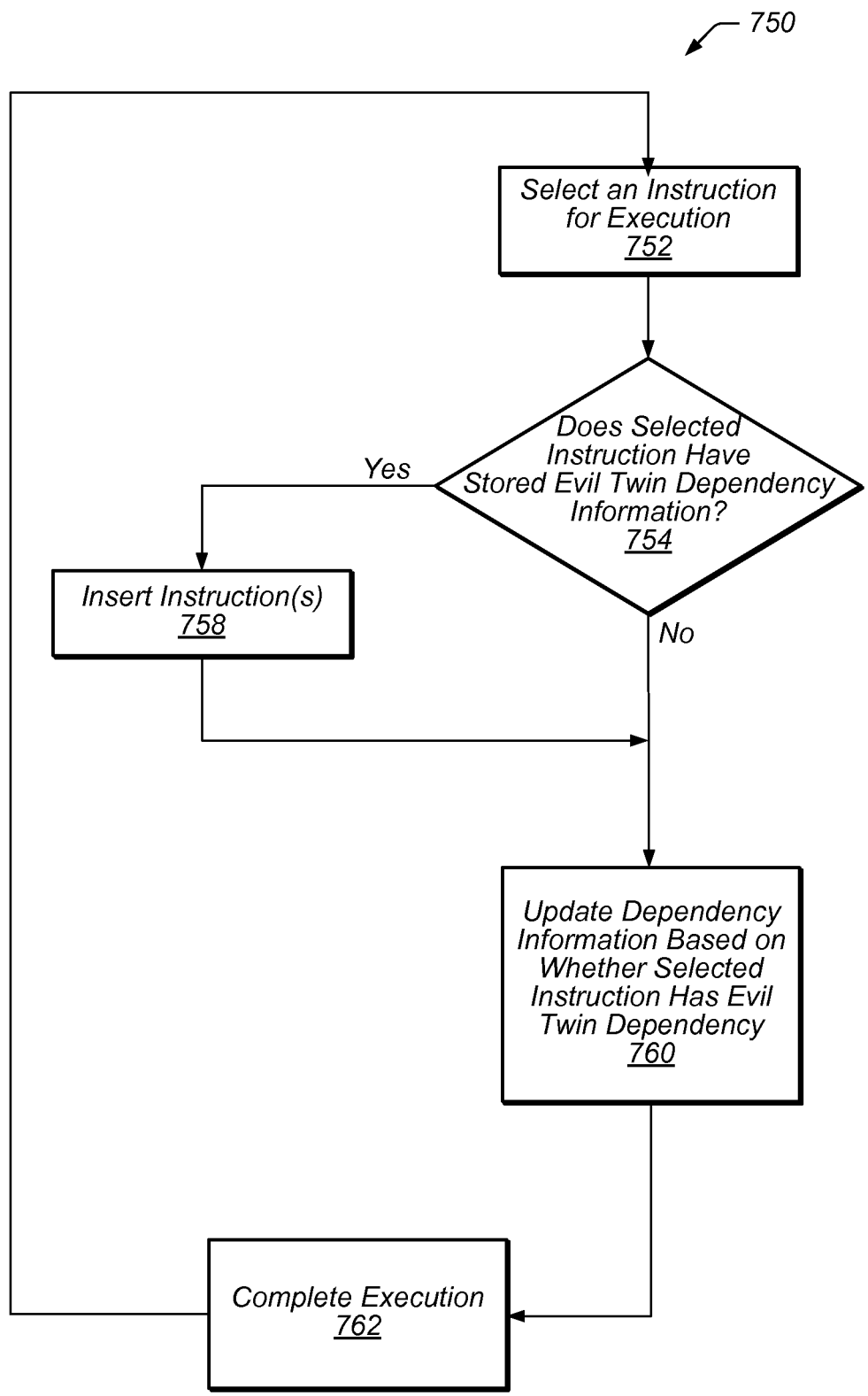
FIG. 7B is a flow chart of another embodiment of a method for detecting an evil twin condition, storing information indicating that condition, and accessing the stored information.

In FIG. 7B, a flowchart for a method 750 for handling evil twin conditions within one or more cores 100 is shown. At step 752, an instruction from an instruction stream is selected for execution in a manner similar to step 702. At step 754, if it is determined that the selected instruction has stored evil twin dependency information in dependency storage unit 402, then at step 758 one or more instructions are inserted into the instruction stream in a manner similar to step 708. Method 750 then proceeds to step 760. At step 760, it is determined whether the selected instruction has an evil twin dependency.

In the case that the selected instruction has no previously stored evil twin dependency information (e.g., step 760 directly follows step 754), the determination of step 760 may be similar to step 706 of FIG. 7A. If it is determined that the selected instruction has an evil twin dependency, then information indicating that is stored in dependency storage unit 402.

In the case that the selected instruction does, in fact, have previously stored evil twin dependency information (step 760 directly follows step 758), a determination is made as to whether the selected instruction would have exhibited an evil twin dependency, but for the insertion of the one or more instructions at step 758. E.g., if it is determined at step 760 that the insertion of the one or more instructions was unnecessary because no evil twin dependency condition would have in fact resulted, the previously stored information in storage unit 402 for the selected instruction may be deleted, invalidated, or otherwise freed. Thus for a subsequent execution of the selected instruction, step 758 may be skipped (as no evil twin information will be stored in unit 402.) Finally, method 750 proceeds to step 762, which may function in a manner similar to step 710 in FIG. 7A.

In other embodiments, a compiler and/or assembler is usable to insert one or more instructions into an instruction stream to avert evil twin scenarios. The term compiler will be used from now on, but this should be understood to refer to a compiler and/or an assembler. The compiler may utilize static compiling techniques, dynamic compiling techniques, just-in-time compiling techniques, any other techniques known in the art of compilers, and any combination thereof. The term "source code" as used herein shall have its ordinary meaning in the art, including source files such as .c, .cpp, .java, etc. Source code also includes object code, any intermediate form of code, and may even include machine code that is executable by a processor. The compiler is capable of generating one or more computer executable instruction streams from source code. The compiler may be stored as instructions on a computer readable memory medium such that the instructions are executable to implement the dependency handling techniques described above and throughout this disclosure.

The compiler may determine that a first instruction in an instruction stream to be generated has the potential to create a dependency condition (e.g., the instruction may be an evil twin producer.) The compiler may examine the instruction stream to predict that the dependency condition will arise between the first instruction and a second, subsequent instruction upon an execution of the instruction stream by a processor. The second instruction may be a potential evil twin victim that, during execution, requires a result from the first instruction before the first instruction completes execution and retires. Note that in this and the below examples, the first and second instructions can be any two instructions in the instruction stream to be generated.

Various techniques, approximations, and/or heuristics can be used by the compiler to determine or predict that a dependency condition will exist between a first and a second instruction in an instruction stream. One technique involves the compiler determining a value representing the separation between the first and second instructions in the instruction stream. E.g., the compiler may determine that a first instruction is followed in the instruction stream by a number of intervening instructions that precede the second instruction. If this number of intervening instructions is below or equal to a predetermined threshold, the compiler may predict that a dependency condition will exist (e.g., if the first and second instruction are close enough the compiler will predict that the first instruction will still be in-flight during at least a portion of the second instruction's execution).

In some embodiments, the predetermined threshold may be a low number such as 4 or 8, but larger numbers are possible as well depending on architecture or other factors. E.g., the threshold could be 32, 64, 256, 512, 1024, etc. (The predetermined threshold may, in fact, be any number and is not limited to a power of 2. The numbers shown above are illustrative only.) Calculating the number of intervening instructions may involve data flow analysis in some embodiments, including loop unrolling. For example, if a first instruction and second instruction are separated by a loop, the compiler may determine or predict how many intervening instructions will issue as a result of the loop being executed two or more times.

In response to a prediction that a dependency condition exists between a first instruction and a second, subsequent instruction in the instruction stream, the compiler may insert one or more instructions after the first instruction and prior to the second instruction. The inserted instructions may be executable by a processor to eliminate the dependency condition between the first and second instructions. For example, the execution of the inserted instructions may cause a double-precision physical register of the processor to contain two values corresponding to two respective single-precision physical registers, as discussed in greater detail in various examples above.

Note that if there are multiple evil twin victims corresponding to the same evil twin producer (first) instruction, the compiler only needs to insert the one or more instructions ahead of the earliest (with respect to program flow) evil twin victim. The compiler may insert instructions into one or more areas of the instruction stream in order to eliminate one or more predicted dependency conditions (e.g., multiple inserted instructions in multiple locations may serve to eliminate multiple dependency conditions). In some embodiments, the compiler could even be configured to insert instructions into some regions or types of regions of the instruction stream, but not others. The compiler may be an optimizing compiler, and one optimization it may perform is to determine if there are redundant instructions inserted to eliminate dependency conditions, and removing those redundant instructions from the instruction stream to be generated. The generated instruction stream may be stored on any computer-readable memory medium for either later execution or immediate execution by one or more processors.

Articles of manufacture that store instructions (and, optionally, data) executable by a computer system to implement various techniques disclosed herein are contemplated. These articles of manufacture include tangible computer-readable memory media. The contemplated tangible computer-readable memory media include portions of memory 810 of system 800 (without limitation SDRAM, DDR SDRAM, RDRAM, SRAM, flash memory, and of various types of ROM, etc.), as well as storage media or memory media such as magnetic media (e.g., disk) or optical media (e.g., CD, DVD, holographic storage, and related technologies, etc.). The tangible computer-readable memory media may be either volatile or nonvolatile memory.

Exemplary System Embodiment

As described above, in some embodiments, processor 10 of FIG. 1 may be configured to interface with a number of external devices. One embodiment of a system including processor 10 is illustrated in FIG. 8. In the illustrated embodiment, system 800 includes an instance of processor 10, shown as processor 10a, that is coupled to a system memory 810, a peripheral storage device 820 and a boot device 830. System 800 is coupled to a network 840, which is in turn coupled to another computer system 850. In some embodiments, system 800 may include more than one instance of the devices shown. In various embodiments, system 800 may be configured as a rack-mountable server system, a standalone system, or in any other suitable form factor. In some embodiments, system 800 may be configured as a client system rather than a server system.

In some embodiments, system 800 may be configured as a multiprocessor system, in which processor 10a may optionally be coupled to one or more other instances of processor 10, shown in FIG. 8 as processor 10b. For example, processors 10a-b may be coupled to communicate via their respective coherent processor interfaces 140.

In various embodiments, system memory 810 may comprise any suitable type of system memory as described above, such as FB-DIMM, DDR/DDR2/DDR3/DDR4 SDRAM, or RDRAM®, for example. System memory 810 may include multiple discrete banks of memory controlled by discrete memory interfaces in embodiments of processor 10 that provide multiple memory interfaces 130. Also, in some embodiments, system memory 810 may include multiple different types of memory.

Peripheral storage device 820, in various embodiments, may include support for magnetic, optical, or solid-state storage media such as hard drives, optical disks, nonvolatile RAM devices, etc. In some embodiments, peripheral storage device 820 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc. In one embodiment, peripheral storage device 820 may be coupled to processor 10 via peripheral interface(s) 150 of FIG. 1.

As described previously, in one embodiment boot device 830 may include a device such as an FPGA or ASIC configured to coordinate initialization and boot of processor 10, such as from a power-on reset state. Additionally, in some embodiments boot device 830 may include a secondary computer system configured to allow access to administrative functions such as debug or test modes of processor 10.

Network 840 may include any suitable devices, media and/or protocol for interconnecting computer systems, such as wired or wireless Ethernet, for example. In various embodiments, network 840 may include local area networks (LANs), wide area networks (WANs), telecommunication networks, or other suitable types of networks. In some embodiments, computer system 850 may be similar to or identical in configuration to illustrated system 800, whereas in other embodiments, computer system 850 may be substantially differently configured. For example, computer system 850 may be a server system, a processor-based client system, a stateless "thin" client system, a mobile device, etc. In some embodiments, processor 10 may be configured to communicate with network 840 via network interface(s) 160 of FIG. 1.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus comprising:
   an execution unit;
   a predictor table that includes a plurality of storage elements, including a storage element configured to store information indicative of a first execution dependency between a first floating-point instruction and a second floating-point instruction in an instruction stream;
   wherein an initial one of the first and second floating-point instructions in the instruction stream specifies a first portion of a logical register as a destination, and the other, subsequent one of the first and second floating-point instructions collectively specifies at least the first portion and a second portion of the logical register as a source;
   wherein the apparatus is configured, in response to information indicative of the first execution dependency stored in the storage element, to:
      insert one or more instructions into the instruction stream between the first and second floating-point instructions; and
      execute the inserted one or more instructions along with unmodified versions of the first and second floating-point instructions;
   wherein at least one of the inserted one or more instructions specifies the first and second portions of the logical register as a destination;
   wherein the inserted one or more instructions are executable by the execution unit to cause a physical register within the apparatus to receive first and second floating-point values that are to be used collectively as a value of the source specified by the subsequent floating-point instruction; and
   wherein the predictor table is configured to store a plurality of addresses, each of which corresponds to a respective instruction in the instruction stream detected to exhibit an execution dependency.

2. The apparatus of claim 1, wherein the physical register is a double-precision register having two single-precision portions.

3. The apparatus of claim 1, wherein the apparatus is configured to detect the first execution dependency between the first and second floating-point instructions, and wherein the execution dependency is an evil twin dependency.

4. The apparatus of claim 1, wherein the apparatus is configured to store information usable to identify the first floating-point instruction in the storage element in response to detecting the first execution dependency.

5. The apparatus of claim 1, wherein the apparatus is configured to store information usable to identify the second floating-point instruction in the storage element in response to detecting the first execution dependency.

6. The apparatus of claim 3, further comprising a decode unit configured to insert the one or more instructions into the instruction stream; and
   wherein the inserted one or more instructions:
      create a second execution dependency between the inserted one or more instructions and the subsequent floating-point instruction; and
      break the first execution dependency between the initial and subsequent floating-point instructions.

7. The apparatus of claim 3, further comprising an instruction cache including a plurality of instruction storage locations, each of which is configured to store at least one instruction executable by the processor, wherein each of the instruction storage locations is further configured to store pre-decode bits associated with the at least one instruction stored therein, wherein the pre-decode bits for each instruction storage location include at least a portion of a respective one of the plurality of storage elements.

8. The apparatus of claim 7, wherein the apparatus is configured to store information indicative of the first execution dependency in the pre-decode bits within one of the plurality of instruction storage locations that is associated with the first floating-point instruction in response to detecting the first execution dependency between the first and second floating-point instructions.

9. The apparatus of claim 7, wherein the apparatus is configured to store information indicative of the first execution dependency in the pre-decode bits within one of the plurality of instruction storage locations that is associated with the second floating-point instruction in response to detecting the first execution dependency between the first and second floating-point instructions.

10. The apparatus of claim 2, further comprising:
a decode unit configured to insert the one or more instructions into the instruction stream; and
an instruction cache including a plurality of instruction storage locations, each of which is configured to store at least one instruction executable by the processor, wherein each of the instruction storage locations is further configured to store pre-decode bits associated with the at least one instruction stored therein, wherein the pre-decode bits for each instruction storage location include at least a portion of a respective one of the plurality of storage elements.

11. A method comprising:
in response to accessing stored information within a processor core during an execution of at least one of a first and a second floating-point instruction in an instruction stream:
    inserting one or more instructions into the instruction stream between the first and second floating-point instructions; and
    executing the inserted one or more instructions along with unmodified versions of the first and second floating-point instructions;
wherein an initial one of the first and second floating-point instructions specifies a first single-precision portion of a first double-precision register as a destination, and wherein the other, subsequent one of the first and second floating-point instructions collectively specifies the first single-precision portion and a second single-precision portion of the first double-precision register as a first source;
wherein at least one of the inserted one or more instructions specifies the first and second portions of the logical register as a destination and is executable to cause a physical register to store first and second floating-point values that are to be used collectively as a value of the first source specified by the subsequent floating-point instruction; and
wherein a predictor table comprises the stored information and includes an address corresponding to at least one of the first and second floating point instructions, wherein the predictor table indicates an execution dependency between the first and second floating-point instructions, and wherein the predictor table is configured to store a plurality of addresses, each of which corresponds to a respective instruction in the instruction stream detected to exhibit an execution dependency.

12. The method of claim 11, further comprising:
detecting, in the processor core, the execution dependency between the first and second floating-point instructions;
in response to detecting the execution dependency, storing the information indicative of the execution dependency in one of a plurality of storage elements.

13. The method of claim 12, wherein the stored information is also indicative of the initial floating-point instruction being an evil twin producer; and
wherein the inserted one or more instructions are executable by the processor core to cause a first physical double-precision register in a plurality of physical registers to receive first and second single-precision floating-point values that correspond, respectively, to values of the first and second single-precision portions of the first double-precision register specified as a first source by the subsequent floating-point instruction.

14. The method of claim 12, wherein the stored information is indicative of the subsequent floating-point instruction being an evil twin consumer; and
wherein the inserted one or more instructions are executable by an execution unit to cause a first physical double-precision register in a plurality of physical registers to receive first and second single-precision floating-point values that correspond, respectively, to values of the first and second single-precision portions of the first double-precision register specified as a first source by the subsequent floating-point instruction.

15. The method of claim 12, wherein a third floating-point instruction between the first and second instructions in the instruction stream specifies the second single-precision portion of the first double-precision register as a destination; and
wherein the inserting of the instructions into the instruction stream is performed, at least in part, at a decode unit within the processor.

16. The method of claim 13, wherein the subsequent floating-point instruction specifies as a second source a second double-precision register having two single-precision portions; and
wherein the inserted one or more instructions are executable by the execution unit to avert a potential evil twin condition with regard to the specified second register by causing a second physical double-precision register in the plurality of physical registers to receive third and fourth single-precision floating-point values that correspond, respectively, to values of the two single-precision portions of the second double-precision register specified as a second source by the subsequent floating-point instruction.

17. The method of claim 16, wherein the stored information is stored within an instruction cache associated with the processor core; and
wherein the inserting of the instructions into the instruction stream is performed, at least in part, at a decode unit within the processor.

18. An apparatus comprising:
an execution unit;
a plurality of storage elements, including a storage element configured to store information indicative of a first execution dependency between a first floating-point instruction and a second floating-point instruction in an instruction stream;
wherein an initial one of the first and second floating-point instructions in the instruction stream specifies a first portion of a logical register as a destination, and the other, subsequent one of the first and second floating-point instructions collectively specifies at least the first portion and a second portion of the logical register as a source;

wherein the apparatus is configured, in response to information indicative of the first execution dependency stored in the storage element, to:
insert one or more instructions into the instruction stream between the first and second floating-point instructions; and
execute the inserted one or more instructions along with unmodified versions of the first and second floating-point instructions;

wherein at least one of the inserted one or more instructions specifies the first and second portions of the logical register as a destination;

wherein the inserted one or more instructions are executable by the execution unit to cause a physical register within the apparatus to receive first and second floating-point values that are to be used collectively as a value of the source specified by the subsequent floating-point instruction; and wherein the apparatus further comprises an instruction cache including a plurality of instruction storage locations, each of which is configured to store at least one instruction executable by the processor, wherein each of the instruction storage locations is further configured to store pre-decode bits associated with the at least one instruction stored therein, wherein the pre-decode bits for each instruction storage location include at least a portion of a respective one of the plurality of storage elements.

* * * * *